United States Patent [19]
Cyman et al.

[11] Patent Number: 5,796,411
[45] Date of Patent: Aug. 18, 1998

[54] HIGH RESOLUTION REAL TIME RASTER IMAGE PROCESSING SYSTEM AND METHOD

[75] Inventors: Theodore F. Cyman, Grand Island; Edward W. Schimminger, Tonawanda; Frank J. Rocco, Lockport; Carl F. Armstrong, Buffalo; Frank J. Mariani, Grand Island, all of N.Y.

[73] Assignee: Moore Business Forms, Inc., Grand Island, N.Y.

[21] Appl. No.: 500,011

[22] Filed: Jul. 10, 1995

[51] Int. Cl.$^6$ .................................................. G06F 15/16
[52] U.S. Cl. .................. 345/502; 395/101; 395/104; 395/110
[58] Field of Search .................... 395/101, 104, 395/109, 110, 114–116, 167, 171, 501, 502, 507, 509; 358/296, 448; 345/501, 502, 507, 509

[56] References Cited

U.S. PATENT DOCUMENTS

| | | | |
|---|---|---|---|
| 5,003,496 | 3/1991 | Hunt, Jr. et al. | 395/134 |
| 5,109,476 | 4/1992 | Thompson | 395/105 |
| 5,113,494 | 5/1992 | Menendez et al. | 395/502 |
| 5,146,554 | 9/1992 | Statt | 395/128 |
| 5,506,941 | 4/1996 | Kurumida | 395/109 |
| 5,528,374 | 6/1996 | Matias | 358/296 |
| 5,572,631 | 11/1996 | Kavathekar et al. | 395/115 |
| 5,572,632 | 11/1996 | Laumeyer et al. | 395/109 |

OTHER PUBLICATIONS

Output Devices: Faster RIPs and Recorders by Alexander et al, Seybold Report on Publishing Systems, v. 22, No. 16, May 19, 1993.

Moore Business Forms, "Operator's Manual, XL Data System Version 2.01," Jun. 1992.

Moore Business Forms, "G–RIP, Generic Raster Image Processor, SCITEX Engine Control Module (ECM), Technical Reference," Mar. 15, 1995.

Moore Business Forms, "C–RIP Color Raster Image Processor, Operator's Guide & Technical REference," Nov. 28, 1995.

Moore Business Forms, "G–RIP, Generic Raster Image Processor, SCITEX Engine Control Module (ECM), Operator's Guide," Mar. 15, 1995.

Moore Business Forms, "G–RIP/SD MICA, Generic Raster Image Processor/Scaled–Down Version driving the MOORE Independent Cartridge Array, Operator's Guide," Oct. 12, 1995.

Moore Business Forms, "Generic RIP SD Technical Reference", undated.

Moore Business Forms, "G–RIP Generic Raster Image Processor, Set Up & Test Procedures," Mar. 15, 1995.

Primary Examiner—Kee M. Tung
Attorney, Agent, or Firm—Nixon & Vanderhye, PC.

[57] ABSTRACT

A raster image processing system and method that can keep up with the fastest high resolution printers now available can process images "on the fly"—that is, generate images from compact input representations so rapidly that printing can occur substantially in the same real time as raster image processing of input data. This system is capable of automatically "screening" data relating to the images so that the various gray scales or color levels are correct for a contone printing process. Different print engine control modules can be replaceably plugged into and out of the system to allow it to be used with different types of print engines/intelligent imaging systems—including high speed, high resolution color printing engines. A high speed data cache and associated array disk drive provide high speed throughput of data into the system. The disk array may, for example, store a library of high resolution graphics that can be accessed "on the fly" as needed in response to the input data stream. A graphics accelerator can generate, on the fly, many "primitive" or simple graphics (e..g, angles, lines, boxes, etc.) at the same time that the remainder of the print image is being generated.

6 Claims, 16 Drawing Sheets

RISC SOFTWARE FUNCTIONAL BREAKDOWN

XL INTERFACE MODULE 100

XL INTERFACE REGISTRATION CONTROLLER

RISC

BIG (BIT IMAGE GENERATOR)

MIDAX ECM BLOCK DIAGRAM

INDIGO ECM BLOCK DIAGRAM

GRAPHIC MODULE BLOCK DIAG.

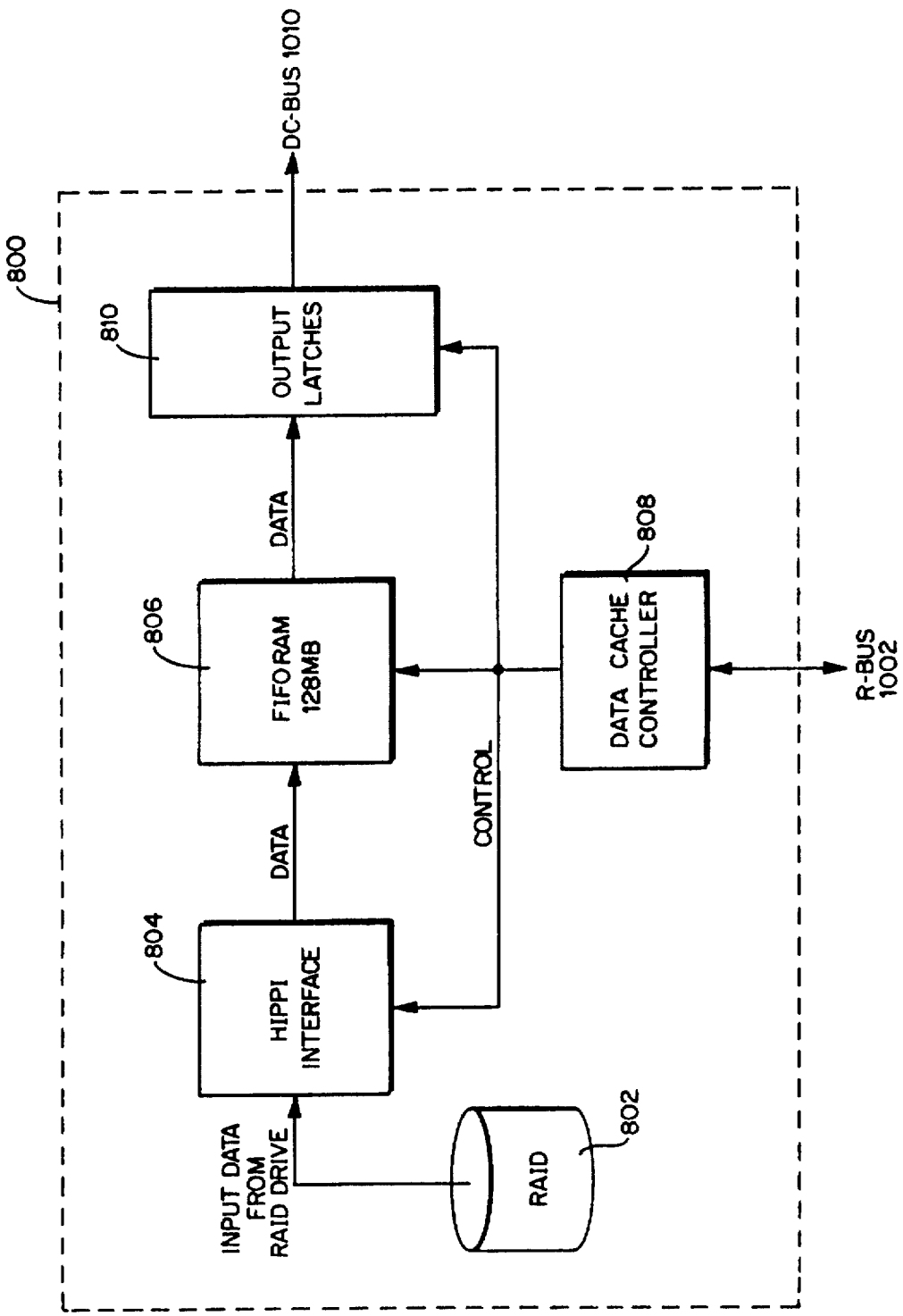

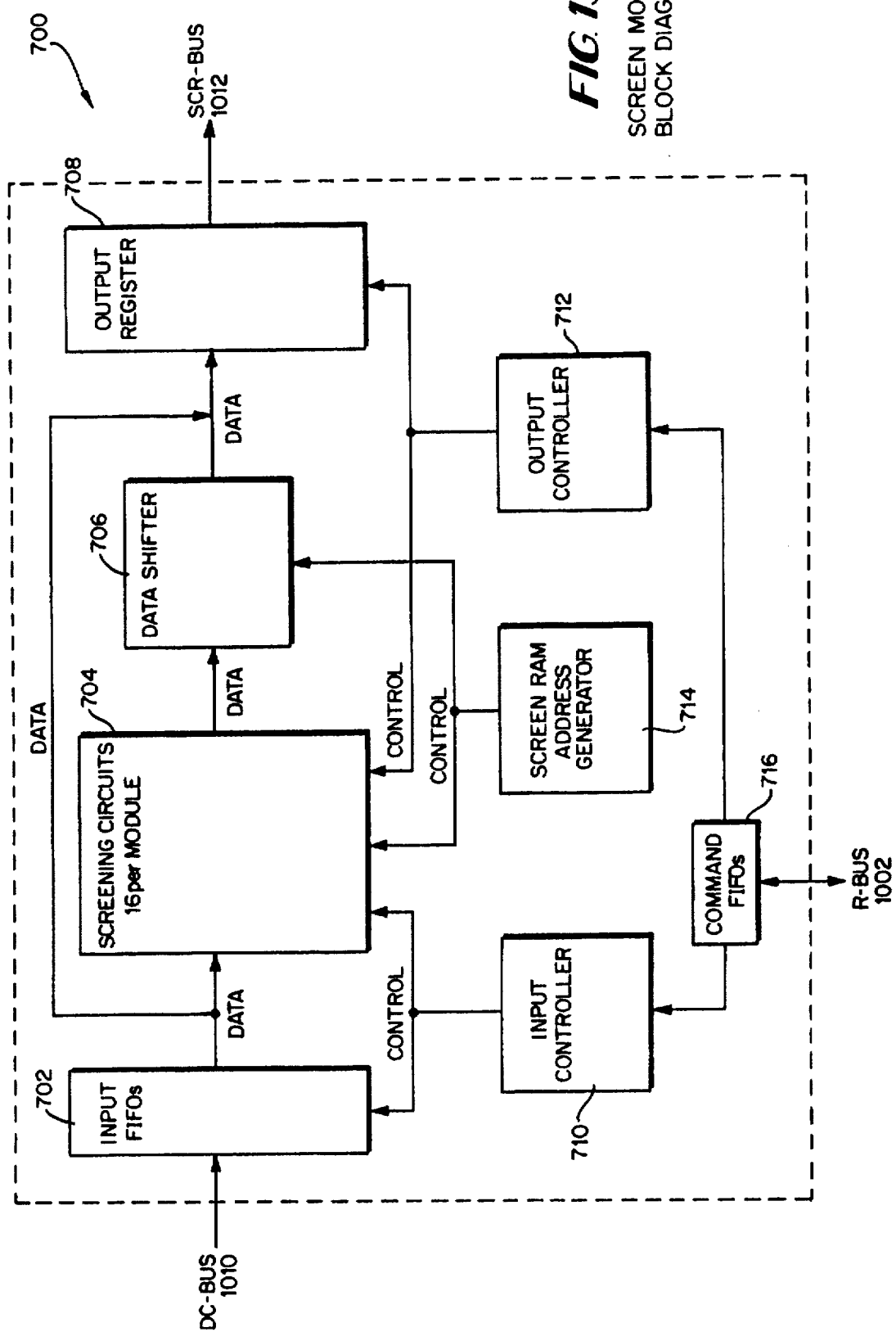
FIG. 13 SCREEN MODULE BLOCK DIAGRAM

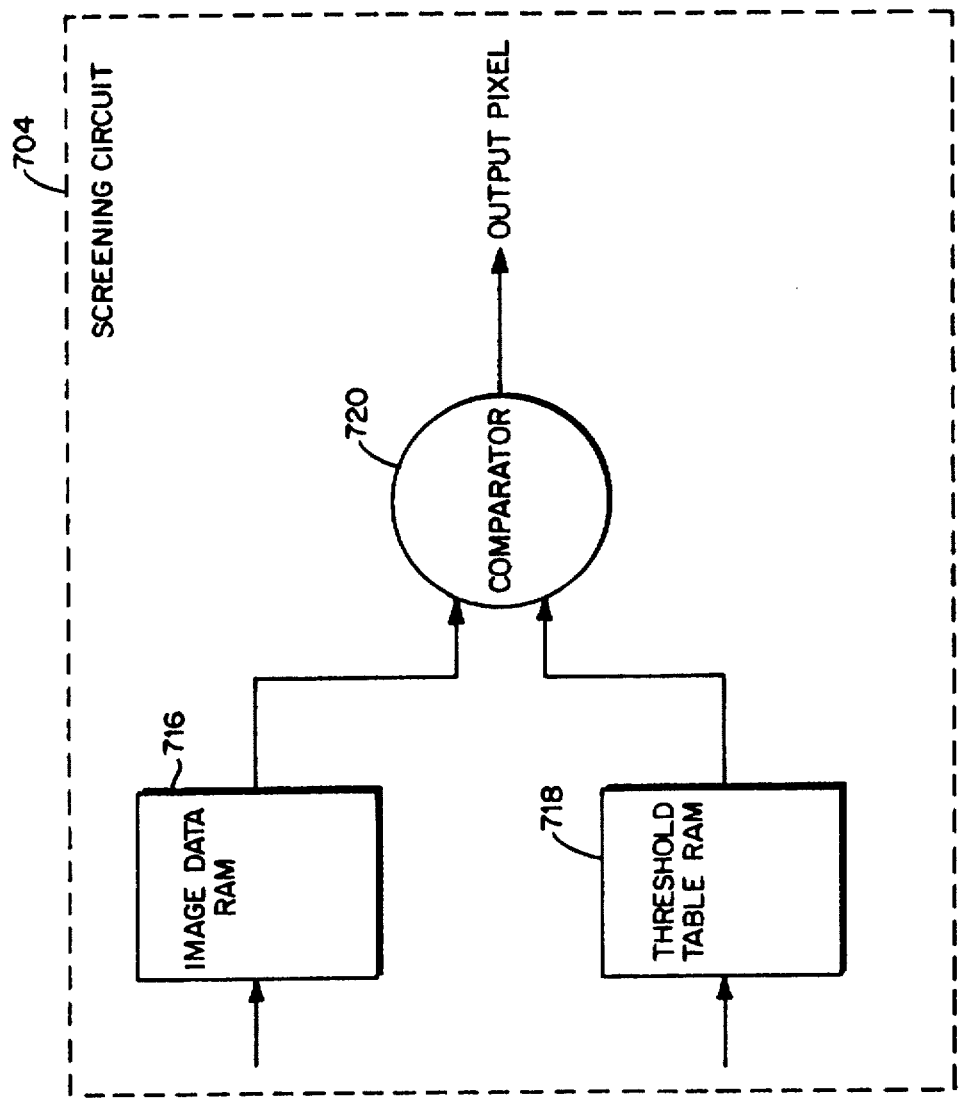
FIG. 14 SCREENING CIRCUIT BLOCK DIAGRAM

HIGH RESOLUTION REAL TIME RASTER IMAGE PROCESSING SYSTEM AND METHOD

FIELD OF THE INVENTION

This invention relates to high speed, high resolution intelligent electronic imaging, and more particularly to high speed electronic plateless printing. More particularly, the present invention relates to Raster Image Processors ("RIPs") for rapidly generating images. Still more particularly, the present invention relates to high speed dedicated Raster Image Processor Systems for real time generation of high resolution images including various different types of image objects.

BACKGROUND AND SUMMARY OF THE INVENTION

Modern high speed electronic "plateless" printing engines have capabilities not even dreamed of only a few years ago. For example, the current line of MIDAX® printing engines available from Moore Business Forms, Inc. of Lake Forest, Ill. can print high resolution images on a continuous "web" of paper moving at a speed on the order of 500 feet per minute. High speed, high resolution color printing engines are also now available that can print very high resolution (e.g., 600 dpi) color images on continuous or sheet-fed paper moving at speeds of on the order of 300 feet per minute or more.

To provide maximum image flexibility, high performance "intelligent" electronic printing engines generally take as an input, data defining a digital value for each printable location on the printed page. Such locations are commonly referred to as "pixels" (short for "picture elements"). Although pixel-based intelligent electronic printing engines can print virtually any arbitrary image (within the resolution, color and other limitations of the print engine), they require a massive amount of input data for high resolution printing. For example, to print an 8½ inch by 11-inch page at a 600 dots-per-inch resolution requires 5100 ×6600=33.66 million individual pixel values. High speed printers can print on the order of 300 to 500 pages per minute (i.e., on the order of 8 pages or more per second)—and therefore require in the excess of 300 million pixels (120,000 characters) per second. The digital value associated with each pixel may nominally be only one digital "bit" (if the "bit" is "on" the printer should place ink at the corresponding location; if the "bit" is "off" the printer should not place ink at that location). However, modern electronic printing engines provide multiple (e.g., 4) bits for each pixel to encode gray scale level or one of several different colors. This requires a data delivery system that can provide on the order of 1.2 billion digital bits per second.

General purpose digital computers of reasonable cost and complexity are not capable of supplying print stream data at these incredible rates. The alternative to real time processing—generating print images "off line" and storing them for later retrieval by the printer—is not feasible at least because the amount of data involved in an average print run is too massive to be economically stored and rapidly accessed using conventional mass storage techniques.

To meet the data rate demands of prior generations of intelligent electronic printing engines, dedicated systems commonly known as Raster Image Processors ("RIPs") were developed to generate image data based on a compact input representation such as a PostScript file or other variable data stream. Some such prior RIP designs could not generate image data in real time. Thus, these prior RIPs suffered from the drawback that the data coming in from the input device had to be completely converted before any output data could be supplied to the output printing device and the print job could begin to run. This inability to rasterize in real time required each print job to be handled in two phases: an off-line conversion process, and a later on-line printing process. This caused delays, and was a severe problem with "just in time" requirements for delivery of completed print jobs to customers.

Some prior art RIP systems were, however, capable of generating image data "on the fly" while the print job was running. One example of a prior art raster image processor capable of generating image data in real time synchronism with printing operations is the "Hybrid RIP" ("H-RIP") manufactured by Moore Business Forms, Inc. and described in Technical Reference Manual entitled "H-RIP Technical Manual" (Moore Business Forms, Inc. 1994. The H-RIP system used dedicated hardware circuitry controlled by a microprocessor-based master controller to generate rasterized print image data in real time. Briefly, the prior art H-RIP system accepted, as an input, a standardized file format stored on a mass storage device such as magnetic tape. In this prior design, an intermediate "XL Data System" read the input file from the tape and supplied it to the H-RIP for processing. The H-RIP included an XL Interface that received and buffered the data from the XL data system and supplied the data to a microprocessor-based master controller. The master controller interpreted the input data and created a display list specifying the objects to be rendered on the next printed page. The master controller wrote bit map images of the fonts required to image the display list representation into a Font Image Memory ("FIM") to make these objects available for rendering. The master controller then controlled the FIM to write the bit map images into a Binary Image Generator ("BIG") including a pair of full-page bit map memories—thereby "rendering" a memory image of the entire page to be printed. While one page of image was being created in one of the full-page bit map memories, dedicated print engine control and interface circuitry could access an already complete memory image in the other memory and provide its pixel values to the printing engine in real time synchronism with paper "web" movement. Typically, the printer engine could not accept a full page at a time, but rather required the data to be presented to it in smaller "chunks" (e.g., in blocks comprising one or several lines of the image). The H-RIP supplied these "chunks" to the printer engine in synchronism with the engine's need for the data.

Moore's prior art H-RIP system was successful in its own right. However, further improvements are possible. For example, this prior art H-RIP system does not have sufficient speed and bandwidth to keep up with advanced high-speed high-resolution print engines now available. Additionally, the prior art H-RIP was limited to monochrome printing and had no color capabilities. Furthermore, this prior art H-RIP was limited to only a single input format, and could not handle graphical images efficiently. In addition, the prior art H-RIP could work with only a single type of print engine (a Moore Business Forms MIDAX® intelligent printer) and was incompatible with other print engine types. As discussed below, these shortcomings present severe disadvantages in some applications.

One disadvantage of the prior H-RIP design relates to its ability to work with only a single type of printer. The H-RIP was custom-designed to supply data to a Moore MIDAX® 300 intelligent printer, and was incapable of working with any other (non-compatible) printer. However, purchasers typically have a choice of several different models of intelligent printing engines, and larger printing facilities may have several different types of printers for use with different types of print runs. For example, one printer may be used for production of long print runs, another printer may be used for production of short runs which require high quality graphics and color, and a still further printer might be optimal for printing text with simplified graphics such as lines, boxes and angles. In the past, the print shop had to purchase a different RIP system for each different printer device since each RIP was specifically customized for a corresponding particular printer.

The requirement for several different types of RIPs (each of which may cost several tens of thousands of dollars, assuming they are even commercially available) led to great expense and confusion. For example, different RIP systems typically would have completely different cabling, installation, maintenance and other requirements. Technicians and operators had to be trained to service each of several dissimilar RIP systems. Spare parts for many different RIP systems had to be stocked. Software and input data incompatibilities between the different RIP systems required extensive logistical coordination to ensure that print jobs were prepared for the right combination of RIP and uniquely-associated print engine. These problems may have effectively limited the number of different types of printing devices a given printing facility could afford to have-thus decreasing the types of printing services that could be offered to customers.

Prior art RIPs such as the H-RIP also suffered from the disadvantage that it could only accept input data in a single standardized format. To use input data in a different format, a print operator would have to convert the data to the standard format (or use a different RIP designed to accept that different input format). Each time the printer operator wanted to use a different input format, he or she would have to convert the data to a format usable by the RIP associated with the printing device scheduled to print the job. The printer operator might have to custom tailor or purchase a RIP or other appropriate conversion system if no existing system would handle the new, non-standard format. Conversions off line were tedious, sometimes unreliable, and added substantially to the overall processing time and man hours required to complete a particular print job. For example, to process a single print order comprising multiple parts representing different input formats, the print operator might have to run the first part of the job, and then reset the system with a different RIP (which must be done off line) to interpret a different input format. He or she would then run the next part of the print set, and possibly thereafter reset and reconfigure the system again to run a further part of the job using a still different input format. The operator would have to continue in this fashion until the entire multi-part print job was completed—a rather lengthy, cumbersome and inefficient process which was quite time consuming.

Moreover, prior RIP designs such as the H-RIP were not capable of providing in excess of 300-million pixels per second required to drive high speed, high resolution monochrome and color electronic print engines. Prior RIP systems capable of generating color graphic images were limited to conversion speeds of about 100 million pixels per second— whereas the most current high resolution color printing engines can require data at rates in excess of three times that. Throughput and bandwidth problems are exacerbated by the ever increasing use of complex graphics in the intelligent imaging process. Processing operations related to graphics and adjusting portions of the page to accommodate the graphics can be very time-consuming operations, and full-color high resolution graphics take up a great deal of storage space. The manipulation of graphic images may also require the input data to be "screened" to provide appropriate color grades—adding even more processing time.

There is thus a long felt need for a raster image processor that can receive inputs in various different formats (e.g., fonts, full color graphics, line art, patterns, etc.) from a variety of different input devices and is capable of generating outputs in different formats usable by different types of printing (or other) output devices. In addition, there is a need to provide a raster image processor having very high throughput that is also capable of screening and processing color data. There is also a need to provide a raster image processor that is modular and expandable to meet varying needs and requirements. Furthermore, it would be desirable to provide a raster image processor that can generate high resolution graphics data "on the fly" to supply in real time to a high speed print engine.

The present invention provides a raster image processor that can meet these objectives. It provides a raster image processing system and method that can keep up with the fastest high resolution printers now available. It can process images "on the fly"—that is, generate images from compact input representations so rapidly that printing can occur substantially in the same real time as the RIP processor processes the input data. This has substantial benefit to customers because it allows print orders to be turned around very rapidly, thereby satisfying the requirements of "just in time" delivery—which was not possible using some prior RIP based systems.

The ability to form print images in real time is farther enhanced by the use of a high speed data cache and associated array disk drive to provide high speed throughput of data into the system. The disk array may, for example, store a library of high resolution graphics that can be accessed "on the fly" as needed in response to the input data stream. In the preferred embodiment, the disk array provides very high storage capability and throughput (e.g., total storage of 32 gb of information that can be accessed at a rate of over 50 mb per second). This allows the system to access graphical images while the particular print job is underway—enabling nearly simultaneous conversion, retrieval and printing of graphics and images. A data caching arrangement coupled to the disk array provides a FIFO (first-in-first-out) caching/buffering arrangement to maximize throughput and reduce access time.

To further enhance graphics capabilities, the system may also provide a custom graphics accelerator that can generate, on the fly, many "primitive" or simple graphics (e..g. angles, lines, boxes, etc.) at the same time that the remainder of the print image is being generated.

The present invention in a preferred embodiment may, for example, provide a completely modular architecture including an XL interface module for input data synchronization and interfacing, a master controller module for overall control and coordination, a RISC high speed processor module for data conversion and manipulation, a Font Image Memory ("FIM") module for storing bit images of fonts, a Binary Image Generator ("BIG") module for double-buffered storage of full-page images, and an Engine Control Module ("ECM") controlling and interfacing with particular printer or other output devices.

In the processing and printing of documents, a job block or file is provided which contains a description of the entire job to be run including a page by page layout of the job. Once input is received, the RIP collects and assembles the characters and other image "objects" in a full page bitmap memory. The information provided with the job determines the size and positioning of text and graphics. The system automatically "remembers" where certain characters are positioned so as not to duplicate or overlay new characters.

The present invention has been able to achieve vastly superior speeds to that of prior RIP based systems, and can operate at speeds upwards of 300 mega pixels per second. Part of the success of the system and its ability to operate at such high speeds, is that the preferred embodiment of the instant invention is also capable of "screening on the fly." That is, it can automatically screen data relating to the images so that the various gray scales or color levels are correct for a contone printing process.

Other advantageous features provided in accordance with this invention include:

A high performance "generic" RIP for a multiplicity of printing or other output devices.

Capabilities and speeds not attainable using prior RIP designs.

Expandable to maintain low cost for lower level applications while still providing the capabilities required by high performance color printing devices.

Maintains compatibility with prior RIP designs—can run the same RIP code used to run prior Moore Hybrid RIP and PC configuration systems.

Up to 20,000 Job Input Block ("JIB") entries per page.

Up to 32,000 standard characters or 16,000 kanji type—mono characters per page; 15,000 colored screened text Up to 254 fonts per job each containing up to 65,535 characters.

Up to eight patterns per job using optional screening hardware.

Up to 3,000 logos per job.

Ability to generate rules, rectangles and sides of boxes without additional storage overhead.

Supports the Moore Command Code Stream (MCCS) (a standard output of the data system for MIDS applications) and is also compatible with the Moore MIDAX® format.

Half-tone screening module converts continuous tone images to half-tone screen images "on the fly" during production for high resolution output engines.

Graphics module is capable of generating bar charts, pie charts, diagonal and curved lines "on the fly" during production.

Feedback for quality metrics and system productivity.

Accepts a variety of input formats including:

images in the form of fonts (e.g., outline format, Adobe type 1 or Moore XLF format), line art (compressed or uncompressed), and ConTone images;

objects represented in dynamic MCCS (Moore Command Code Stream) formatted data stream and standard JIB, oriented objects;

full color graphics;

screening tables; and color lookup tables for color applications.

Input may be received from several standard inputs such as, for example, AFP or Advance Functional Printing, which is the standard input from International Business Machines of Armonk, New York, or the standard input from Xerox DJDE Records of Rochester, N.Y.

The printer operator can develop his or her own particular input or font types for use in the production of orders (one such example would be Moore Business Forms, Inc. of Lake Forest, Ill.).

Provides a number of different outputs, including raster data to suitable printing engine, printing engine synchronization and control, data system feedback for engine status, job analysis, error reports and audit trail information.

Examples of output devices include Midax® printer available from Moore Business Forms, Inc. of Lake Forest, Ill., a Scitex Print Station, available from Scitex Digital Printing, Inc. of Dayton, Ohio, or MICA available from Moore Business Forms, Inc. of Lake Forest, Ill. For color printing, example output devices include Indigo (available from Indigo America, Inc. of Amherst, N.H.) and Xeikon (available from Xeikon N.V. of Mortsel, Belgium).

Very high data rates:

120,000 characters per second (220% faster than prior Hybrid RIP design);

320 million pixels per second (assuming pixels are moved in 64 pixel blocks).

Additional graphics capabilities boost graphics oriented speeds to the 320 million pixels per second rate.

Imaging of variable full process color images and colored text in addition to existing XL/Hybrid capabilities.

Upwardly compatible with XL Data System, print devices, job and fonts so that existing jobs written for prior RIP designs will run.

More than 1000 8½×11" full color, full process color images variably from form to form or equivalent coverage using smaller images.

Full color images and colored text and line art can be printed using half-tone screening technology. Full color images can be half-tone screened "on the fly" as they are printed. The system can screen a document at various line frequencies (e.g., 50 lpi to 150 lpi in increments of roughly 5 lpi) and dot shapes (e.g., round, square, elliptical and line). Super cell technology provides very accurate angles for process color screening.

Any object which overlaps another object of a different color will utilize trapping to avoid undesired contamination by the underlying image.

Imaging of text and line art in a number of modes describing the way in which the image is formed and the manner in which it is merged into the page. The following modes of text and line art formation are supported: Normal (solid/colored text); Pattern (geometric filled text); Picture (image-filled text). The system supports several merge types including Transparent (background remains), Overprint (background replaced), Knockout (background under character glyph is removed).

Elements—the smallest entity within an object—are selectable based on the results of a particular selection criterion and test, providing a higher level of selectability allowing only portions of objects to be printed if desired.

Color of an element can be changed via select criteria.

With the optional hardware accelerator we are able to interpret graphic data structures including pie charts, bar charts, form overlays and art at high speeds.

Each job can have up to 64 homogeneous colors defined for use in coloring text and line art. They can be solid ink colors, or colors created by screening various levels of the four process colors. Screened full color continuous tone images are not restricted to these 64 colors.

Color support for four process color inks (e.g., cyan, magenta, yellow and black).

Images can be input via a "front end" system and then networked to a high speed disk array system in the proper format.

Post Script files can be initially converted to bit images by a Post Script interpreter residing on the "front end," or may be interpreted at high speed on download and imaged "on the fly."

Integrated system built out of modular subsystems.

The system ensures data integrity from the live data input media through to the printed page.

Audit trail of job status.

Automatic monitoring and recording of system performance.

All system feedback is easily interpreted by the operator, including error/warning messages and system performance metrics.

BRIEF DESCRIPTION OF THE DRAWINGS

These and other features and advantages provided by the present invention will be better and more completely understood by referring to the following detailed description of presently preferred examples of embodiments of the invention in conjunction with the drawings, of which:

FIG. 12 shows an example of an architecture of a data cache module 800 (including associated RAID disk array);

FIG. 13 shows an example architecture for screen module 700; and

FIG. 14 shows an example implementation for the screening circuits shown in FIG. 13.

DETAILED DESCRIPTION OF THE DRAWINGS

Figure 1:
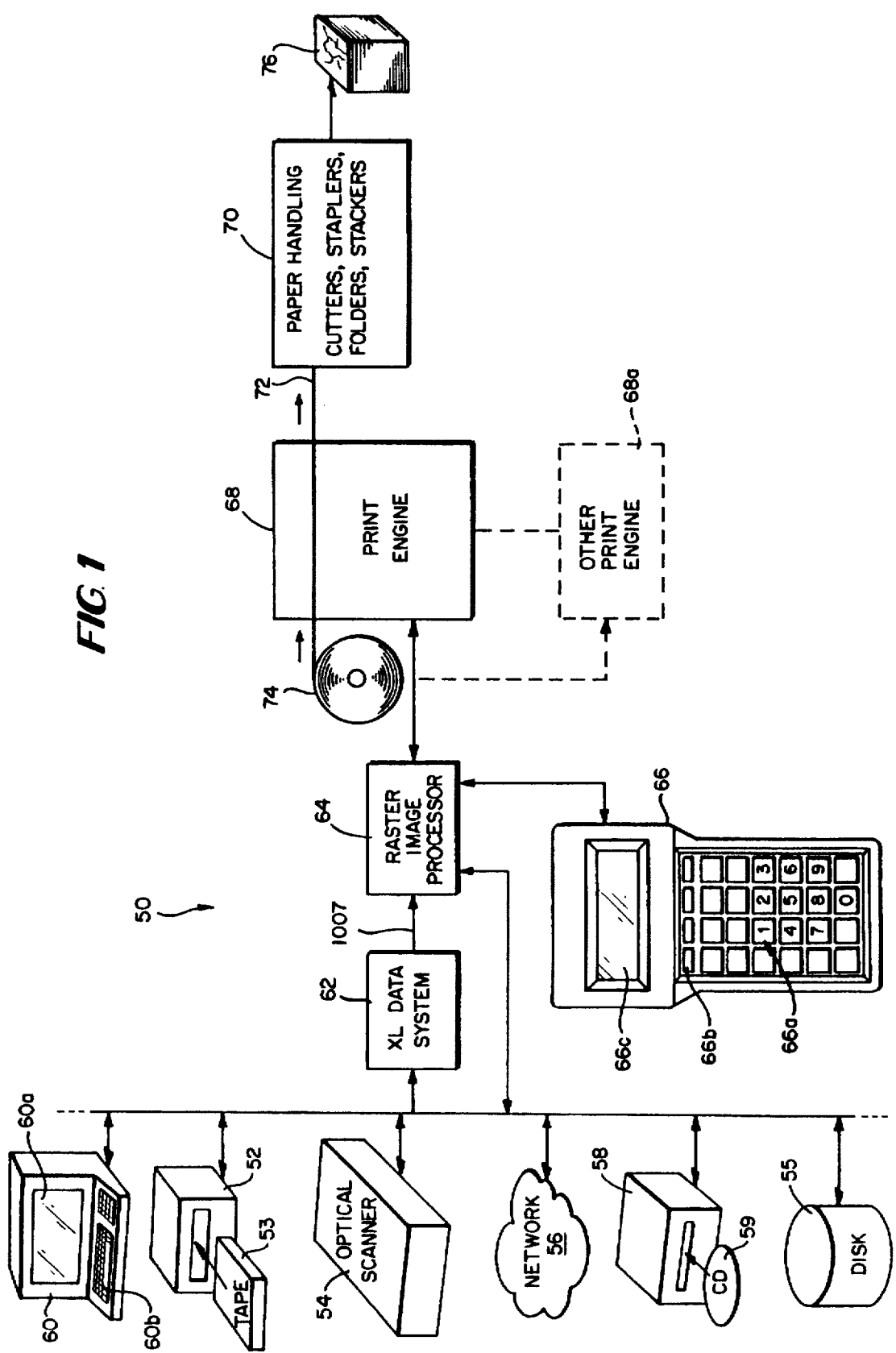
FIG. 1 is an example of an overall intelligent imaging system constructed in accordance with a preferred embodiment of this invention.

FIG. 1 shows an intelligent imaging system 50 provided by the present invention. System 50 performs the overall task of assembling digital image "objects" based on input digital data to create a visible image that can be viewed by a person. In this particular example, the visible image is printed onto a medium such as moving a paper "web" 72 to produce finished printed matter 76 that can be distributed and read or viewed.

Overall Intelligent Imaging System 50

Intelligent imaging system 50 may include various input data sources such as a magnetic tape drive 52, an optical scanner 54, a network 56 and a optical disk drive system 58. In addition, system 50 includes a "front end" computer system 60; an XL data system 62; and a raster image processor 64. Components 60, 62 and 64 are electronic devices that create, store, manipulate and process digital data to produce a digital representation of a visible image. In this example, system 50 further includes a print engine 68 and a paper handling mechanism 70. The print engine 68 may be a high resolution, high speed monochrome or color conventional print engine device, such as, for example, a Moore Business Forms MIDAX® print engine, a Scitex print head, or an Indigo high speed color printer.

The print engine 68 shown in FIG. 1 prints on a continuous "web" 72 of paper supplied, for example, from a large paper roll 74 at high speeds of up to 300 to 500 feet per minute. Print engine 68 includes electronic print heads that print images on web 72 as the web travels through the print engine (i.e., "plateless printing"). The printed web 72 is processed by conventional paper handling mechanisms 70 (e.g., cutters, staplers, gluers, folders, collators, stackers, etc.) to provide finished printed products 76.

The "raw materials" for the images to be printed by print engine 68 come from data sources 52–58. The system 50 accepts input data in a variety of forms including for example:

Images
  fonts such as outline font formats (e.g., Adobe type 1, Post Script, true type and bit stream);
  pre-generated Moore XLF format fonts; LineArt in compressed or uncompressed format; ConTone or full color graphics images; Objects
  dynamic MCCS (Moore Command Code Stream) formatted data stream
  standard JIB oriented objects;
Screening tables;
Color lookup tables;
Executable software for raster image processor 64 to execute;
Job description file instructions including, for example, input text.

Various ones of data sources 52, 54, 56 and 58 may supply these various types of input data as may be convenient. For example, input text to be printed may be stored on magnetic tape 53 or magnetic disk 55. Optical scanner 54 may be used to scan in photographs or other images for storage on disk 55 and later retrieval. Optical drive 58 accepts optical disks 59 that may store a variety of information including, for example, line art, fonts, executables, etc. Network 56 may connect system 50 to other similar systems 50 and/or other computing and/or storage devices located locally or remotely. "Front end" image handling system 60 enables users to input and correct full color images as well as line art, fonts and Post Script files. Front end 60 may be, for example, a general purpose digital computer such as a high-capability personal computer including a display 60a and a keyboard 60b. Front end 60 need not be co-located with the rest of system 50, but could be remote and communicate with XL data system 62 and raster image processor 64 via magnetic tape 53 and/or network 56, for example. Thus, for example, in one configuration the front end 60, optical scanner 54, optical drive 58 and disk 55 might be located remotely to the rest of the system 50, and produce as its "output" a job description file stored on magnetic tape 53. Magnetic tape 53 could then be physically carried to a production floor and inserted into another magnetic tape drive 52 coupled to XL data system 62, raster image processor 64 and print engine 68.

The "human" job coordinator operates front end 60 to perform a variety of tasks. For example, the human operator may, using front end 60, select and collect images from the various data sources such as continuous tone pictures scanned using optical scanner 54, continuous tone images stored on a Photo CD optical disk 59 or Post Script files supplied by magnetic tape 53 and/or disk 55 (or authored using the front end). The human operator also uses front end 60 to collect all line art such as graphics and logos, from either scannable line art or from Post Script files defining the graphics. The human operator also uses front end 60 to identify all fonts needed for a particular printing job, and if necessary, uses front end 60to convert the font layout to an acceptable format. The job coordinator also uses front end 60 to select job layout and configuration. He or she will select and locate all objects to be printed on the finished printed products 76. The job coordinator creates, using front end 60, a "job description file" and supplies it plus all necessary fonts to raster image processor 64 via XL Data System 62 (for example, the job description file may be stored on magnetic tape 53 for later retrieval).

Raster image processor 64 is an electronic device that creates an image in computer memory based on the job description file provided by front end 60, and sends the digital image to print engine 68 for printing. More particularly, raster image processor 64 rasterizes variable combinations of text, graphics and continuous tone images at high speed based on an inputted job description file, and outputs the rasterized image in digital form to print engine 68 in real time synchronism with the operations of the print engine. Raster image processor 64 monitors the travel of web 72 through print engine 68 and synchronizes its operations with web travel. Raster image processor 64 also controls print engine 68 to provide correct print registration of the images the print engine prints on web 72. Raster image processor 64 thus coordinates with XL data system 62 to receive portions of the inputted job description file as they are needed, creates electronic images (in memory) to be printed on web 72, and supplies those electronic images in digital form at the rates, resolutions and formats required by print engine 68.

In the preferred embodiment, raster image processor 64 is capable of driving a number of different print engines or other output devices including, for example, Moore's MIDAX® print engine, Scitex print heads, and other imaging devices. FIG. 1 indicates this by showing another print engine 68a that may be coupled to the output of raster image processor 64 instead of print engine 68. In the preferred embodiment, no configuration changes to raster image processor 64are required if the other print engine 68a is compatible with print engine 68. However, if the other print engine 68a is not compatible, then a simple swap of a single plug-in electronic control module within raster image processor 64 for another is all that would be required to allow the raster image processor to work with the other print engine.

In the preferred embodiment, the human operator controls raster image processor 64 through a hand-held data display terminal 66 that includes a keypad 66a, an array of light-up indicators (e.g., light emitting diodes) 66b, and an LCD display 66c. Terminal keypad 66a includes mode keys that select modules within raster image processor 64 to be controlled by the terminal. The human operator can use terminal 66 to read status information and error conditions, control operating parameters (e.g., feet per minute, offset, registration mode, type of registration, etc.), invoke reset and download, and perform a variety of other control operations.

Raster Image Processor Operations

Figure 2:
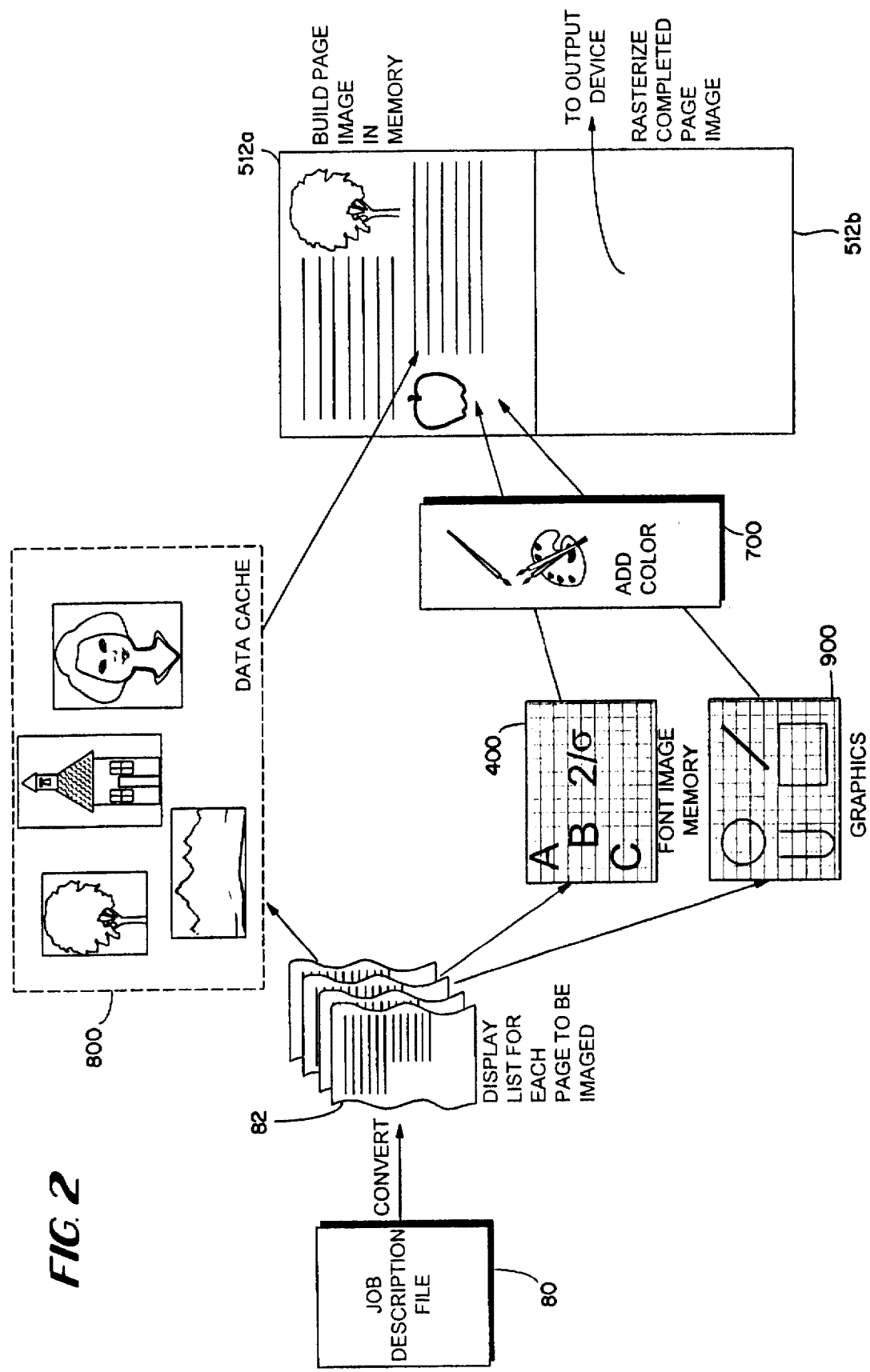
FIG. 2 shows overall example operations performed by the raster image processor shown in FIG. 1.

FIG. 2 shows the overall operations performed by raster image processor 64 in the preferred embodiment. The "front end" 60 supplies a job description file 80 to the raster image processor 64. This job description file 80 typically contains a compact digital representative description how each of the pages of the finished printed product 76 will look. That is, for each different page to be imaged, a job description file will specify all text to appear on the page, identify the fonts to be used, specify any graphics or line art to be included, and also specify (if color imaging is employed) what colors are to be used. Job description file 80 essentially provides a complete representation in digital form of the entire print "job"—which may consist of many different pages of images.

Raster image processor 64 converts the job description file 80 into one or more "display lists" 82. Raster image processor 64 creates a display list 82 for the next (and each) page to be imaged. Display list 82 specifies objects and their corresponding positions on the page as well as color/density information and other characteristics. For example, display list 82 typically specifies text information to be imaged, the position of the text on the page, and the font the text is to be imaged in.

Raster image processor 64 interprets the display list 82 as a list of instructions specifying the next page to be imaged. Raster image processor 64 constructs a digital representation of a complete image in memory in accordance with the instructions contained within the display list 82. Raster image processor 64 interprets the display list 82 to identify all "fonts" (e.g., type styles) required to image the next page. The raster image processor then writes bit map images of the necessary fonts into a "font image memory" ("FIM") 400 so they are available for imaging. Raster image processor 64 also parses the display list 82 to identify all graphics images that need to be supplied to image the page. The raster image processor can generate some simplified types of graphics "on the fly". For example, if a special component called a "graphics accelerator" module 900 is present, the raster image processor 64 can generate curved lines, geometrical shapes, etc. "on the fly" in real time and supply them on an as-needed basis in response to the instructions within the display list 82.

For color imaging, raster image processor 64 may add color information to the font information supplied by font image memory 400 (and also to the graphics generated by graphics accelerator 900)—all as instructed by the display list 82.

The raster image processor 64 can also access pre-stored graphics such as color images, line art, etc., from a graphics library stored in a "data cache" 800. The raster image processor 64 may control "data cache" module 800 (if present) to retrieve and supply the appropriate graphics images as needed and specified by display list 82.

Once the various "objects" to be imaged are ready to be supplied, raster image processor 64 assembles them together to form a complete digital representation of the final image. This digital representation is stored in a "Bit Image Memory" 512. In a preferred embodiment, Bit Image Memory 512 has "double buffers"—i.e., it has a pair of duplicate memories 512a, 512b each of which can store an entire image. This allows raster image processor 64 to output a completed image to the output device at the same time that it is creating the next image in the bit image memory 512 in real time.

In this example, each of Bit Image Memories 512a, 512b comprises a full page "bitmap" having discrete storage locations positionally corresponding to each position on the page that can be filled in with a dot. In a preferred embodiment, this bit mapped memory image may comprise four "bit planes" to provide a total of sixteen ($2^4$) color or monochrome density values. The graphics and line art provided by data cache 800 may supply the appropriate color information directly to Bit Image Memory 512.

When raster image processor 64 has finished storing a completed page image into one of Bit Image Memories 512a, 512b, it ceases accessing that bit image memory and begins working on a new image in the other Bit Image Memory. Output circuitry then accesses the completed image and output the data in a sequence and at a rate required by the print engine 68 being used. Thus, for example, raster image processor 64 may supply the completed bit mapped image one line at a time or multiple lines at a time as required by the print engine 68, and does so at timing synchronized with the movement of web 72 through print engine 68. While one part of the raster image processor 64 is accessing the completed memory image in Bit Image Memory 512a, another part of it may at the same time be building the next page image in its duplicate binary image memory 512b—and still another part of the raster image processor may be converting another portion of job description file 80 into a new display list 62 for the second-to-next succeeding page.

Architecture of Raster Image Processor

Figure 3:
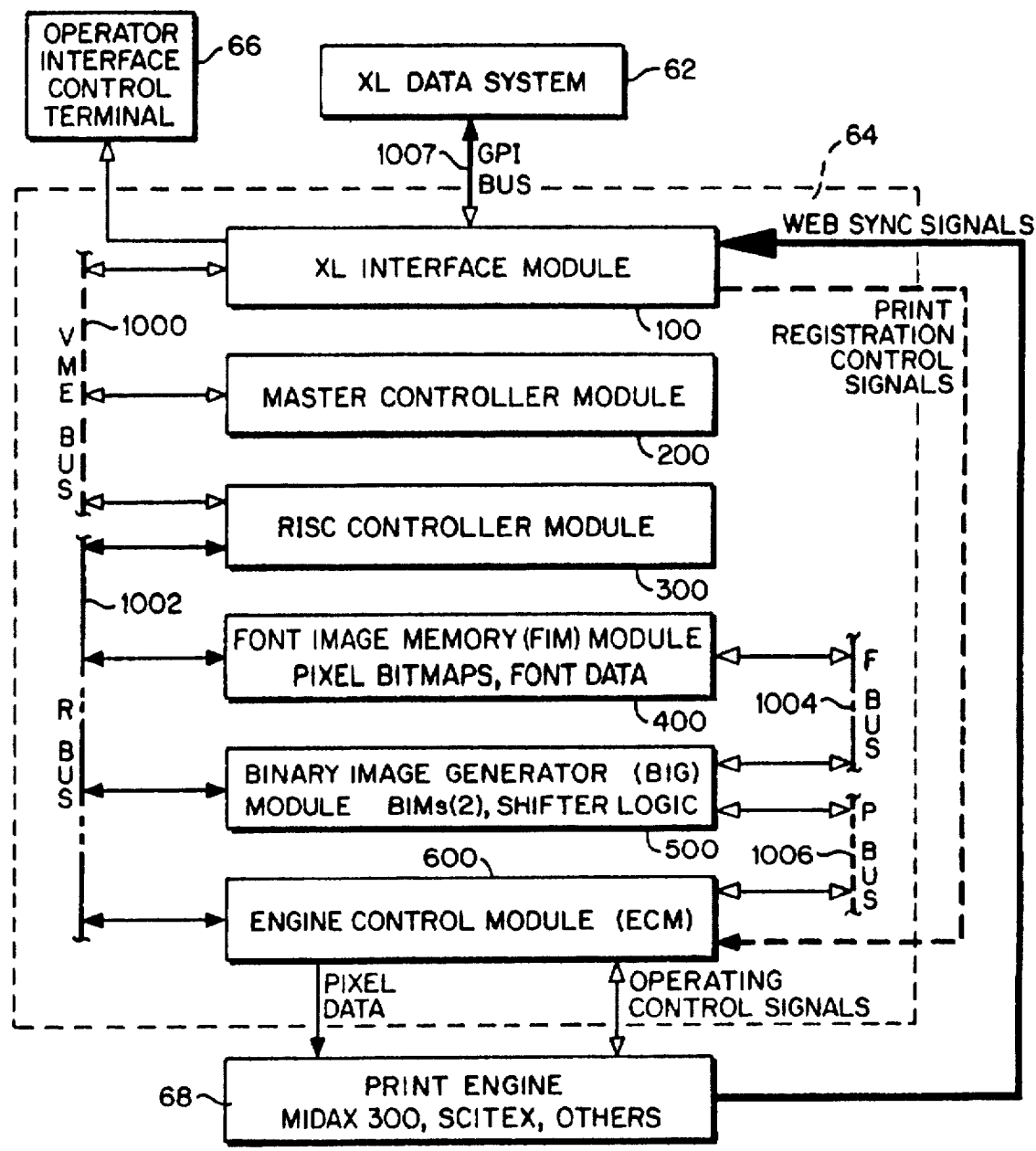
FIG. 3 shows an example architecture of the FIG. 1 raster image processor.

FIG. 3 shows an example modular architecture for raster image processor 64. In the preferred embodiment, raster image processor 64 is fully modular, and is constructed based on a generalized bus architecture and associated back plane that allows the different modules (preferably each of which comprises a single printed circuit board) to be replaceably plugged in and out. This modular architecture provides easy expandability to add additional capabilities (compare FIGS. 3 and 3A), and also allows some modules to be swapped out for other modules to adapt to different requirements (e.g., different output devices such as different print engines).

In the example shown in FIG. 3, raster image processor 64 includes an XL interface module 100, a master controller module 200, a RISC controller 300, a font image memory ("FIM") module 400, a binary image generator ("BIG") module 500, and an engine control module ("ECM") 600. A VME bus 1000 provides communication between XL interface module 100, master controller module 200 and RISC controller module 300. An "R-BUS" 1002 allows communication (image, commands) between RISC controller module 300, FIM 400, BIG 500 and ECM 600. An F-BUS 1004 allows transfer of image date (e.g., fonts and logos) between the FIM 400 and the BIG 500. A P-BUS 1006 transfers final form image data from BIG 500 to ECM 600.

Figure 3A:
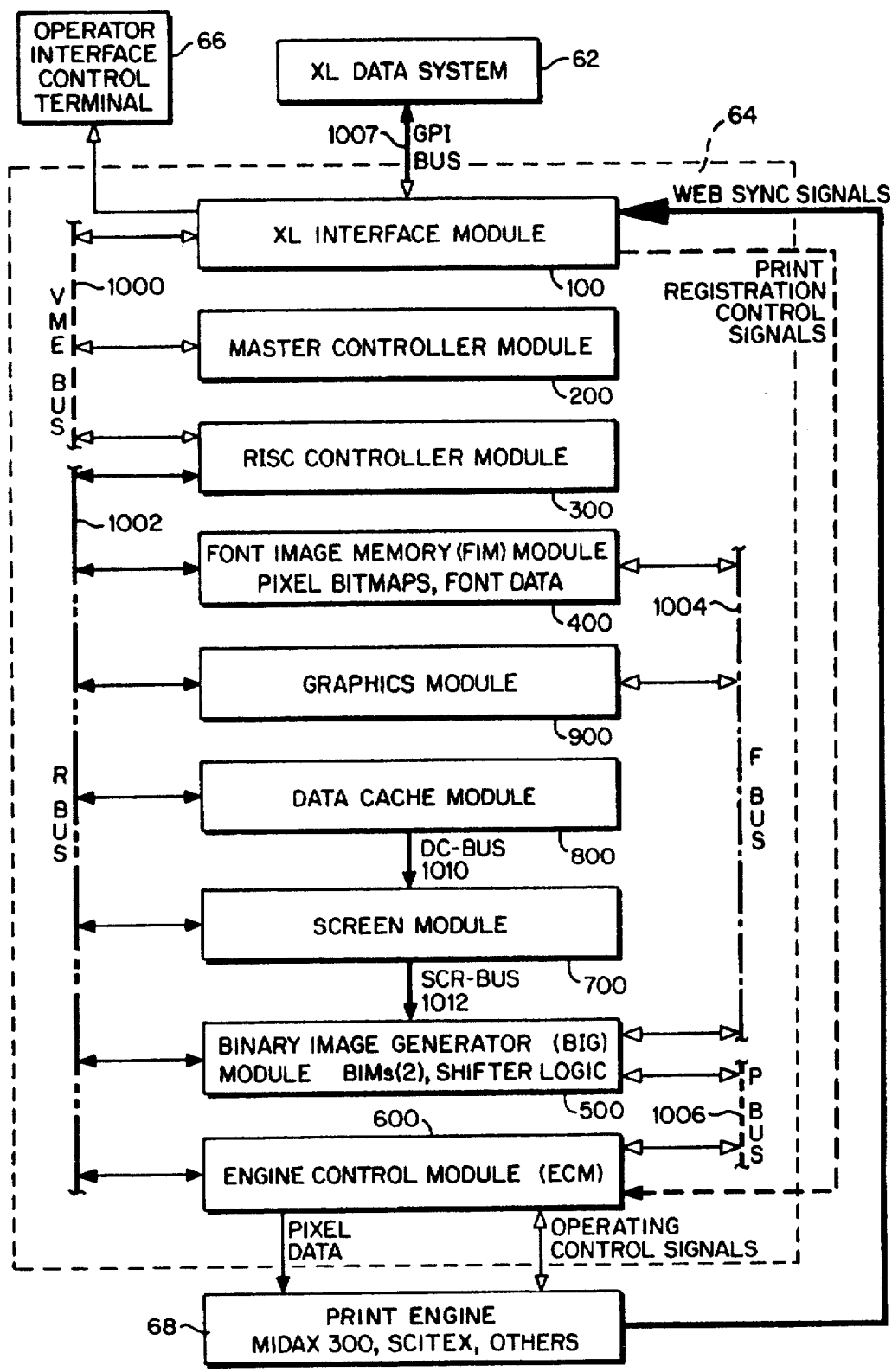
FIG. 3a shows the FIG. 3 raster image processor expanded to include screening, graphics and data cache capabilities.

As shown in FIG. 3A, R-BUS 1002 also provides communications to optional enhancement modules such as, for example, a screening module 700, a data cache module 800 and a graphics module 900. F-BUS 1004 allows transfer of image date between the FIM 400 and/or the BIG 500, and the graphics module 900. In addition, in this expanded configuration, data cache module 800 may communicate data to screening module 700 over a DC (data cache) bus 1010, and screen module 700 may communicate data to BIG 700 via a SCR (screen) bus 1012.

Briefly, the XL interface module 100 accepts the job description file 80 from an XL Data System 62 and supplies it for processing to master controller module 200. Master controller module 200 converts the job description file 80 into display lists 82, and supplies the display lists to RISC controller module 300 for imaging. The RISC controller module 300 coordinates the operations of FIM 400 and the BIG 500 (which contains the Bit Image Memories 512a, 512b) to generate the digital representation of the image based on the display list 82 for the next page to be imaged. The ECM 600 breaks the completed digital representation up into suitably sized "chunks" and provides them to print engine 68 exactly at the time the print engine needs them to print the next portion of the image.

The (optional) graphics module 900 generates vector graphics "on the fly" based on instructions from RISC controller module 300, and also is capable of efficiently de-compressing and/or scaling image files. The (optional) data cache module 800 stores a graphics library and supplies required prestored graphics information to screen module 700 in real time. Screen module 700 "screens" contone image files and provides the resulting pixelized data values to BIG 500.

More Detailed Description of Raster Image Processor Operations

Figure 4:
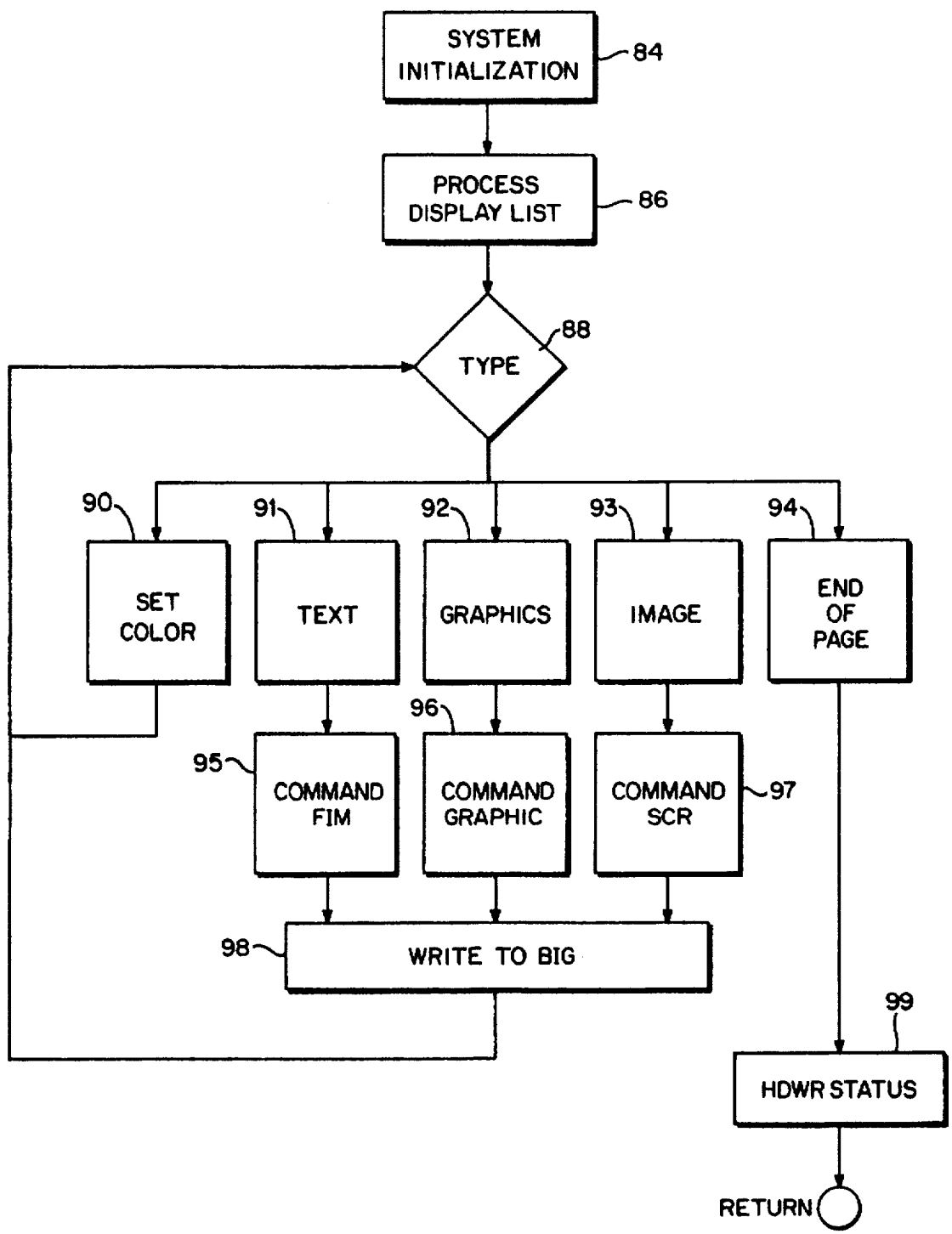
FIG. 4 is a flowchart of example overall control operations performed by the RISC controller module to control data processing by the raster image processor.

FIG. 4 is an example of a sequence of control steps performed by RISC controller module 300 to coordinate the various activities performed by raster image processor 64. Raster Image processor 64 and its associated RISC controller 300 begins operations by initializing (block 84). Then, RISC controller 300 looks for a display list 82 to process (block 86). Once the RISC controller 300 receives a display list 82, it begins parsing it (e.g., from top to bottom) to determine the type of objects it specifies (block 88). If the display list 82 "instruction" specifies a color, then RISC controller 300 sets the default color to the specified color for use in further rendering of text and graphics (block 90). If an "instruction" within display list 82 specifies text (exit block 91), RISC controller 300 sends a command to the FIM 400 (block 95) specifying the characteristics of the text characters to be imaged. If the display list 82 "instruction" specifies a graphic (exit block 92), RISC controller 300 sends a command to the graphic module 900 specifying the characteristics of the graphic to be generated (block 96). If an instruction within display list 82 specifies an image (exit block 93), RISC controller 300 sends a command to the Screen module 97 (block 97). This parsing process continues in an interactive fashion until RISC controller 300 encounters of "end of page" instruction (block 94)—at which time it checks hardware status (block 99) and "returns" to wait for arrival of the next display list 86 to process. Meanwhile, each of FIM 400, Graphic module 900 and Screen Module 700 writes its respective output into the bit image memory 512 within BIG 500.

More Detailed Discussion of Raster Image Processor Modules

The overall operations and architecture of raster image processor 64 are described above. The following provides additional, more detailed descriptions of each of the various modules within raster image processor 64.

XL Interface Module 100

Figure 5:
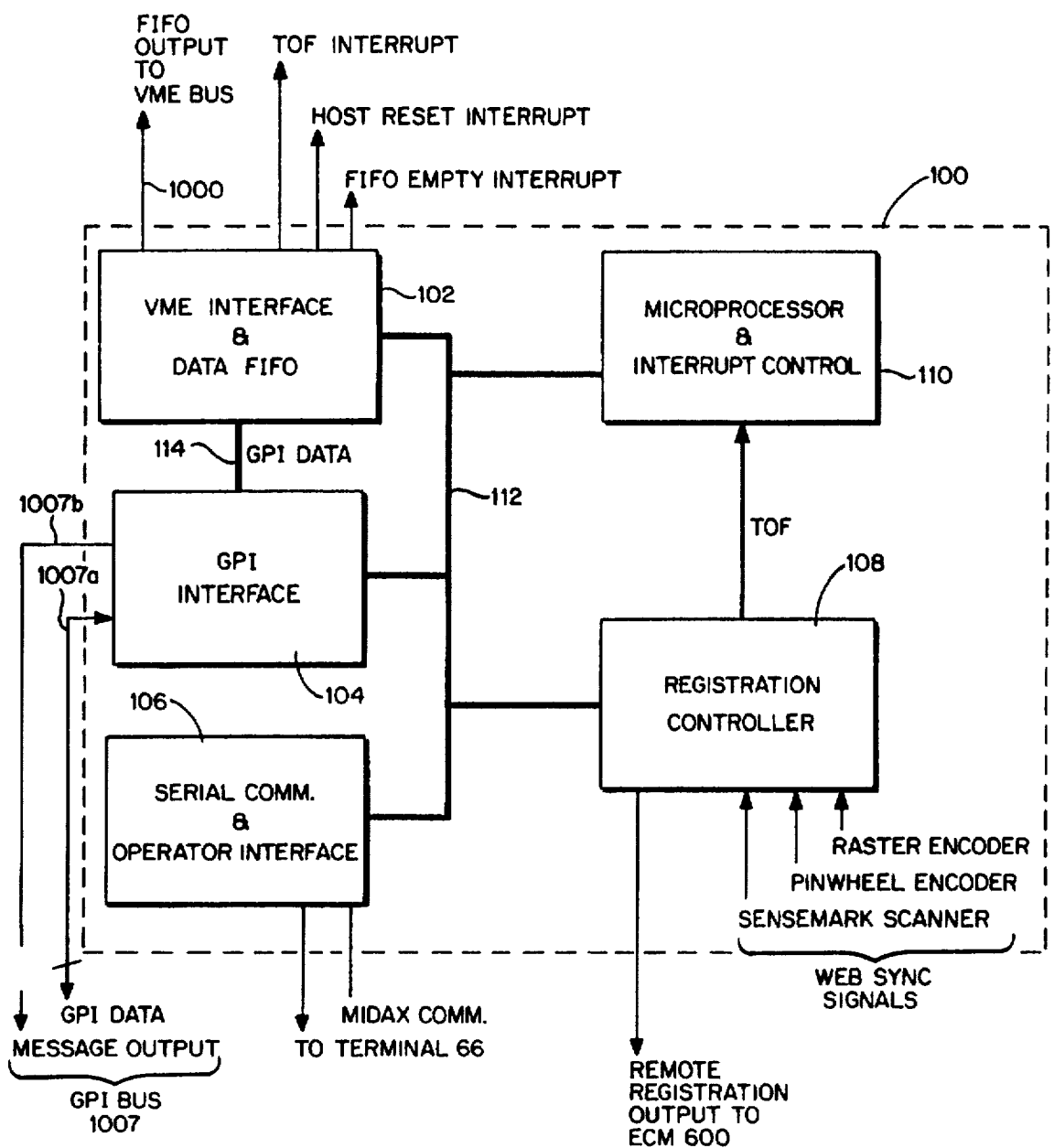
FIG. 5 shows an example architecture for the XL interface module.

FIG. 5 shows an example of an overall architecture for XL interface module 100. XL interface module 100 in this example is a microprocessor-based interface device that:

provides communications between the XL data system 62 via the GPI bus 1007;

provides web synchronization and registration control for the raster image processor 64;

receives data from the XL data system 62 and buffers it into a FIFO (up to 16 mb); and drives operator control terminal 66.

In this example, XL interface module 100 includes a VME bus interface and data FIFO block 102, a GPI bus interface 104, a serial communications and operator interface block 106, a registration controller block 108, and a microprocessor and interrupt control block 110. An internal bus 112 allows blocks 102–110 to communicate among themselves. In addition, a further data path 114 between VME interface and data FIFO 102 and GPI interface 104 allows information to be rapidly transferred from the GPI bus 1007 and the VME bus 1000.

The overall operation of XL interface module 100 is controlled by microprocessor and interrupt control 110, which may include a Motorola 680180 microprocessor with 64 K-bytes of EPROM, 256 K-bytes of RAM and a decode and interface PASIC. In this example, microprocessor 110 controls all functions of XL interface module 100 except for those of data FIFO 102.

Registration controller 108 synchronizes the imaging operations of raster image processor 64 with the travel of web 72. Registration controller accepts web synchronization signals from various encoders and scanners disposed on print engine 60 to monitor the position and travel of web 72. In response, registration controller 108 generates print registration control signals which it provides to ECM 600. ECM 600 uses these print registration control signals to synchronize itself and print engine 68 with the movement and position of web 72.

Figure 6:
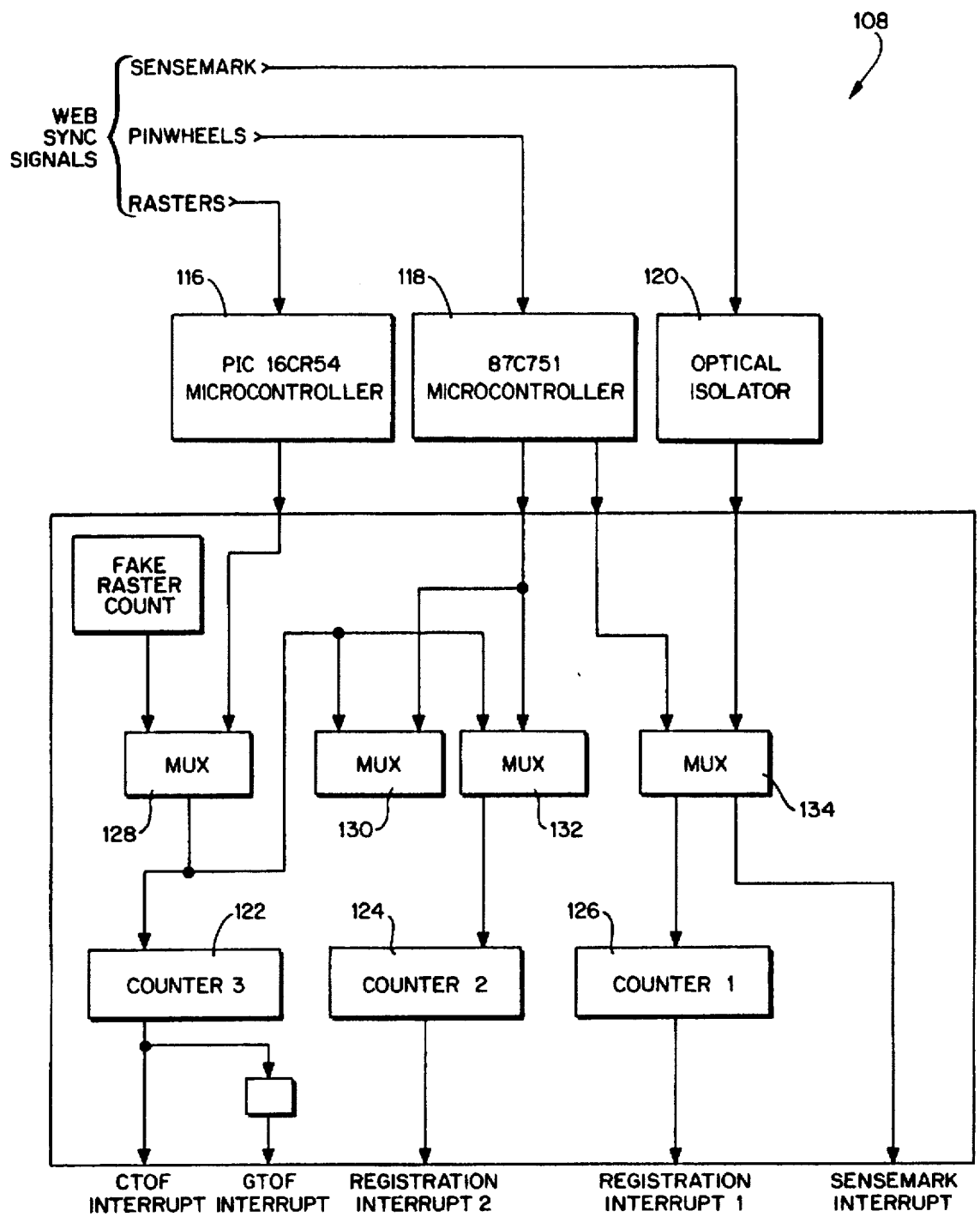
FIG. 6 shows an example architecture for the XL interface registration controller.

FIG. 6 shows a more detailed functional diagram of registration controller 108. The registration controller 108 includes signal conditioning devices 116, 118 and 120 to condition the web synchronization signals it receives. Registration controller 108 also includes registration counters 122, 124, 126 (implemented in this example by one or more PASICs—programmable application-specific integrated circuits) that keep track of the position of web 72 relative to the current (and next) page. An array of multiplexors 128–134 is used to select between the various web synchronization signals depending on the particular registration mode being used. The following table shows examples of how top-of-form is generated in each of five different registration modes:

| Mode | How Top-of-Form is Generated |
| --- | --- |
| Sensemark | Optical scanner senses a preprinted mark on the form |
| Pinwheel | Tractor-driven encoder with resolution of 36 pulses per inch |
| Tight Web | XL Data System's CUE signal |
| Plain Paper | Raster or pitch encoder |
| Fake Mode | Internally generated rasters Test only |

Based on this processing, registration controller 108 generates a top-of-form (TOF) control signal that it supplies to microprocessor and interrupt controller 110. This TOF signal is used as a primary synchronization control signal to synchronize raster image processor 64 with web 72 movement.

Referring once again to FIG. 5, GPI bus interface 104 includes two main functional sections. The first section receives data from GPI bus 1007 and passes it to the on board data FIFO 102 via data path 114. Microprocessor 110 can also pass data to data FIFO 102, using this channel during stand-alone operation. A second section of GPI interface 104 is used to pass message data back—serially—to the XL data system 62. The GPI bus 1007 in the preferred embodiment includes data path 1007 a and a message output path 1007b for these respective purposes.

The serial communications and operator interface block 106 of XL interface module 100 comprises an 8-channel serial controller chip, serial bus drivers, and interrupt control circuitry for microprocessor 110. These channels enable all functional parts of raster image processor 64 to communicate with XL interface module 100 and display terminal 66.

The VME interface and data FIFO block 102 can be, in this example, configured with 4, 8 or 16 mb of memory. This block 102 is used to buffer data from the XL Data System 62 or other host data system to be accessed by master controller 200 across the VME bus 1000. The control logic within VME interface and data FIFO 102 may, for example, comprise a pair of PASICs. One of these PASICs may control the FIFO input, while the other may oversee the reading of the FIFO in the VME bus interface and decode. Interrupt arbitration for the three VME interrupts provided (FIFO empty, TOF and host reset) are also handled by this block 102 in this example.

In more detail, the FIFO controller section of block 102 may consist of DRAM and associated DRAM controller that can be configured as a 4, 8 or 16 mb FIFO. Data from an input latch may be read and put into the main FIFO, and then moved into a smaller on-board 512-byte FIFO as the smaller one is emptied through the VME bus controller onto the VME bus 1000. The DRAM controller in this example produces three main cycles: read, write and refresh. The controller looks for data to be available in its input latch. When data becomes available, the controller performs a write cycle and writes the byte into DRAM. When the FIFO is not empty, and the 512-byte FIFO is not full, then a read cycle is performed to move the byte from the main DRAM FIFO to the 512-byte output FIFO. The DRAM controller also produces a refresh approximately every 15 ms to maintain valid data in the DRAMs.

The VME bus interface section within block 102 in this example contains a PASIC and other circuitry which controls the VME bus decoding and arbitration, as well as the FIFO output data shifting. The FIFO data can be accessed by either byte, word or long word in this example. Data is read from the 512-byte FIFO when not empty, and shifted into an output shifter. The output shifter is a 4-byte shift register in this example that shifts one byte at a time, down to the least significant bit location. As the least significant bit location is filled, the next byte is shifted into the next least significant position until all four bytes are filled. When a byte-wide VME read occurs, the first byte is shifted into the shifter. Next, the three remaining bytes and a new byte from the 512-byte FIFO are shifted simultaneously to fill the shifter again. This also occurs for word and long word FIFO accesses. Block 102 maintains a status register readable by main controller module 200 over the VME bus 1000 that indicates FIFO status and data availability. The VME interface portion of block 102 also includes 2 kB of dual-port RAM in this example that accessible by both the microprocessor 110 and by master controller 200 and RISC controller 300 over the VME bus 1000. This shared RAM is used for control and communication between XL interface module and master controller module 200.

Master Controller Module 200

Master controller module 200 includes a Motorola 68040 microcontroller in this example with an associated 4 Mb of RAM. Master controller module 200 is the master controller of raster image processor 64, and provides for communication between the XL interface module 100 and RISC controller module 300. The master controller module 200, which is based on a prior master controller design used in the prior art Hybrid RIP product, performs various control and processing operations under software control. For example, master controller module 200 maintains a Job Information Block (JIB) that contains information for each line to be imaged including start information, font, rotation, placement and line length. Master controller module 200 also maintains a Font Address Memory that stores the starting pointers of each character within FIM 400. As master controller module 200 processes job information passed to it by XL interface module 100, it passes the information over VME bus 1000 to a memory within RISC controller module 300.

RISC Controller Module 300

Figure 7:
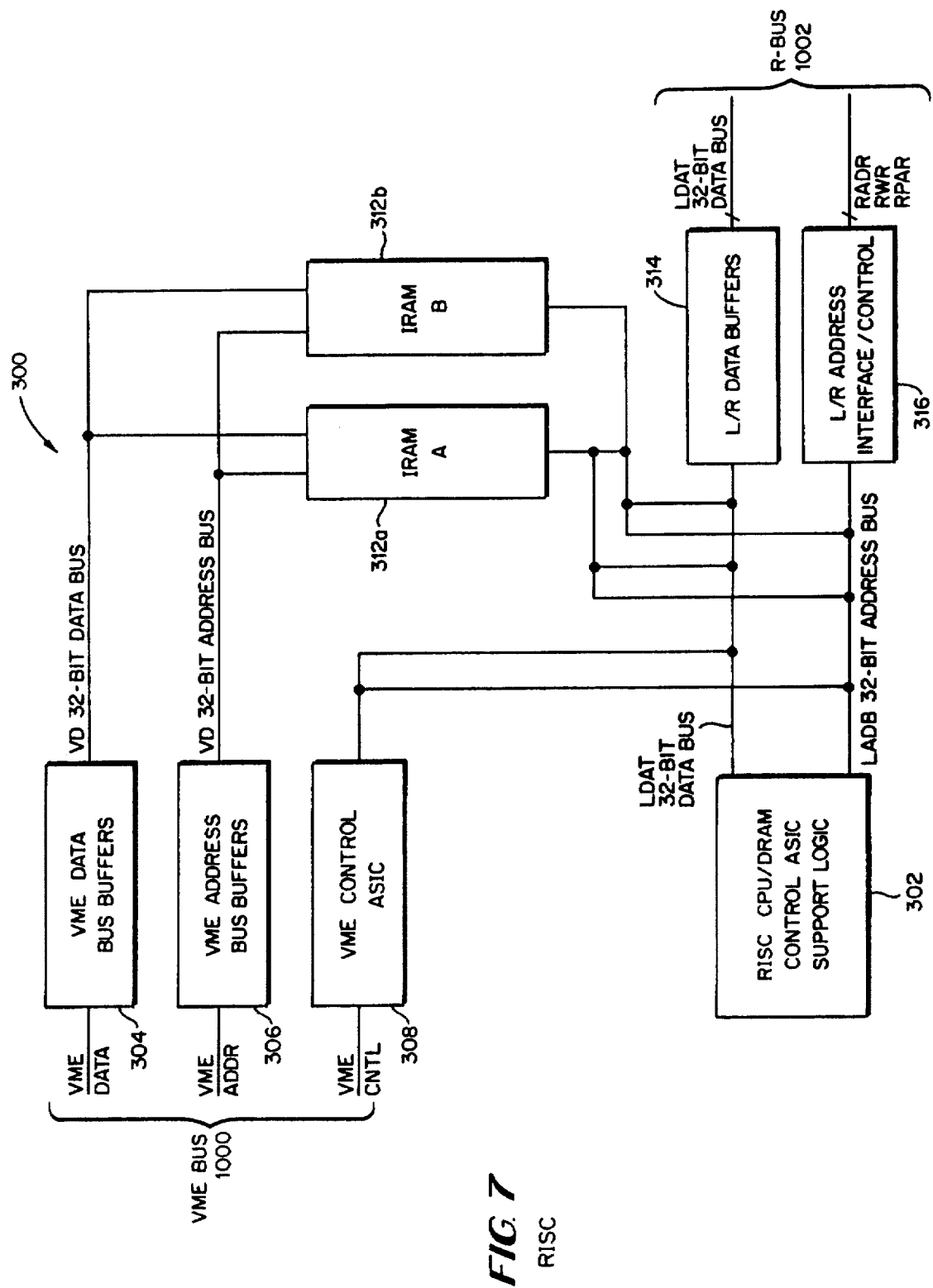
FIG. 7 shows an example architecture for the RISC controller module.

RISC controller module 300 in this example oversees all image handling and synchronization of the FIM 400, BIG 500 and ECM 600. FIG. 7 shows a block diagram of RISC controller module 300. The heart of RISC controller module 300 is a 33000 RISC processor 302 including 4 Mb of DRAM for internal code storage and associated control and support logic for decoding and control operation. RISC processor 302 communicates with the VME bus 1000 via buffers 304, 306 and control logic 308. A pair of 1-Mb SRAM modules 312a, 312b are used to receive job information for the current page to be imaged passed to RISC controller module 300 by master controller module 200 over VME bus 1000. Two SRAMs 312 are used because this memory space is shared between RISC processor 302 and master controller 200, with one SRAM 312 being accessed by the RISC processor and the other SRAM 312b being accessed by master controller 200. RISC processor 302 communicates with R bus 1002 via data buffers 314 and address interface control logic 316. In this example, R bus 1002 provides a 32-bit wide data path, a 32-bit wide address path and additional control lines (e.g., write control and parity).

Font Image Memory 400

FIM 400 comprises a large random access memory used to store the pixel patterns of all of the fonts, logos and patterns being used in the current print job. FIM 400 interfaces to the R bus 1002 (from which it receives pixel images sent to it by RISC controller 300), and outputs stored images via F bus 1004. In this example, F bus 1004 includes a 64-bit data bus 1004b and associated address path 1004a as is shown in FIG. 8 (a block diagram of the internal architecture of an example FIM 400).

Figure 8:
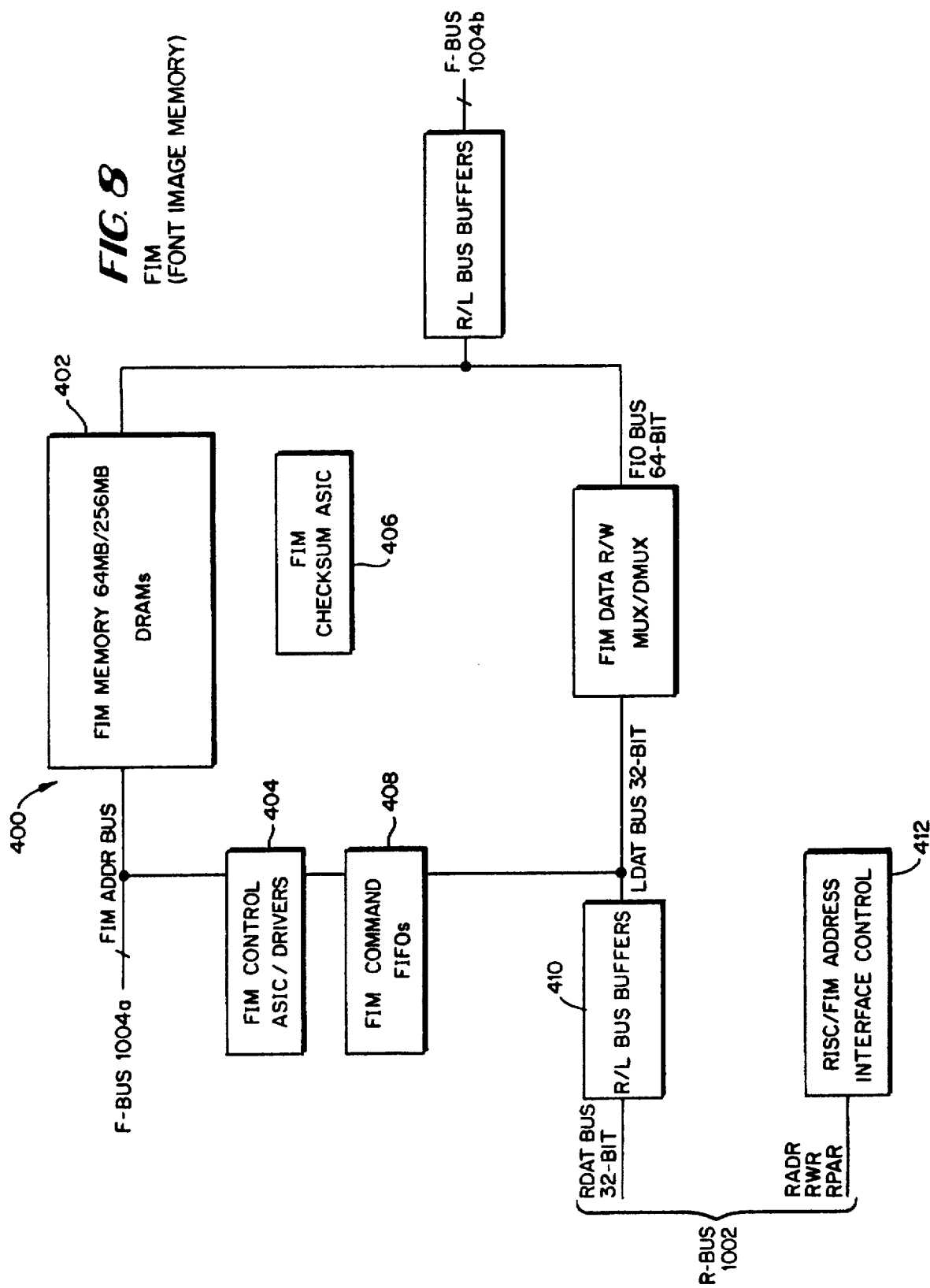
FIG. 8 shows an example architecture for the font image memory (FIM) module.

As shown in FIG. 8, the core of FIM 400 is a large block of random access memory 402 comprising 64 Mb of DRAM expandable to 256 Mb. In this example, RAM 402 may be comprised of eight 2 meg x 36 bit SIMM memory modules that can be upgraded to eight 8 meg x 36 bit SIMMs. ASIC-based refresh control logic 404 performs all necessary DRAM refresh control and DRAM address selection. Drivers within block 404 may operate the address lines, write enable lines, etc., of memory 402. Additional ASIC-based control logic 406 is used in this example to handle the checksum operation for all fonts, logos and patterns being loaded into memory 402. An FIM command FIFO 408 receives FIM commands from RISC controller 300 necessary to place a pixel image into FIM memory 402. These commands are sent to FIM control ASIC/drivers 404 for processing. Interface to R bus 1002 is provided by buffers 410 and interface control 412.

To reduce memory requirements, FIM 400 may store font information in monochrome format and maintain associated color values in the same or different memory. These color values are specified by RISC controller 300 when the RISC controller controls the FIM 400 to write the font information into its memory. During the process of writing the memory contents of FIM 400 to BIG 500, the FIM may supply the color values (e.g., four bits wide) to result in the BIG writing these color values into its bit image memory 512.

Binary Image Generator 500

Figure 9:
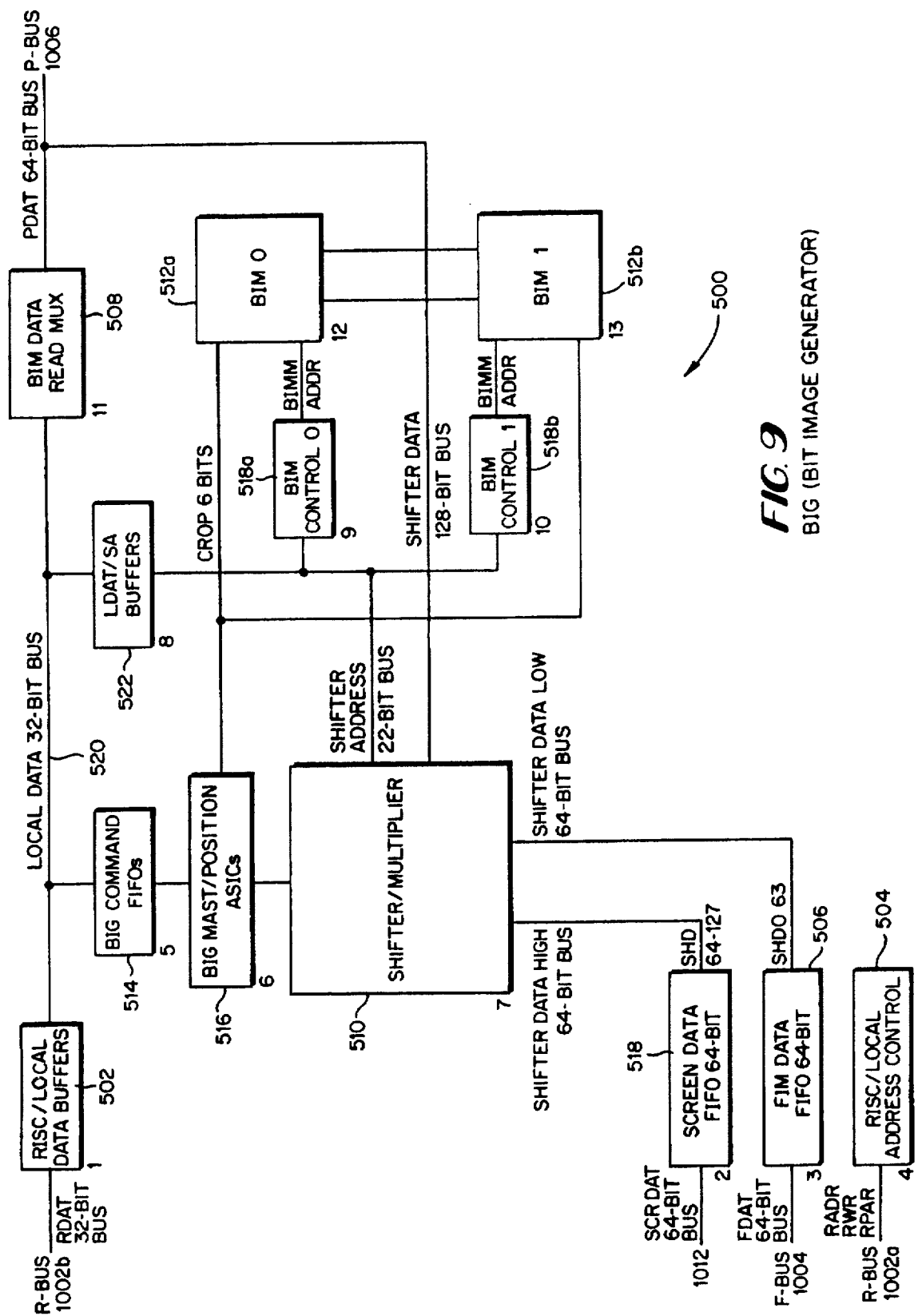
FIG. 9 shows an example architecture for the binary image generator (BIG) module.

Binary image generator 500 assembles and stores a memory image of the final image to be printed. FIG. 9 shows a block diagram of an example of BIG 500. In this example, BIG 500 interfaces with the R bus 1002 via data buffers 502 and address control 504, and interfaces with F bus 1004 via an FIM data FIFO 506. BIG 500 also interfaces with P-bus 1006 (a 64-bit bus in the preferred embodiment) via a BIM data read multiplexor 508 and a shifter/multiplier 510.

The heart of BIG 500 is a pair of binary image memories 512a, 512b each having a size of 64 Mb. Each of memories 512a, 512b store a complete page to be imaged. A shifter/multiplier 510 writes data into one of memories 512a, 512b while the contents of the other are streamed out over P bus 1006 for output. Write operations into memories 512a, 512b occur under control of R bus 1002 via blocks 502, 504. All commands for each character's size, position and type are received via data transceivers within block 502 and written into command FIFOs 514.

The BIG master controller 516 is, in this example, an ASIC that generates BIG timing signals including clock and load signals for X and Y position commands, clock signals for shifter/multiplier 510, and read signals for command FIFOs 514 and screen data FIFO 518. Master controller 516 also originates merge and crop signals, and receives all X and Y size commands for each character's placement within memories 512a, 512b. The Y positions are passed through multiplier 510 prior to being clocked into the BIM controller 518a, 518b. The X positions are placed directly on the internal bus 520.

BIM controllers 518 in this example each comprise an ASIC. There are two BIM controllers 518, one for each BIM 512. BIM controllers 518a, 518b receive shifter address values via internal bus 520. These address values specify the starting point for each character cell for the X and Y positions. Controllers 518a, 518b pass these positions along to BIM memory modules 512a, 512b respectively, in the form of addresses over multiplexed buses that work in conjunction with read and write control signals generated by the controllers 518. Offset bits also supplied by BIM controllers 518a, 518b specify offsets from the nominal addresses specified on the address lines.

Each BIM 512 in this example comprises eight SIMM modules for a total of 64 Mb of memory. Each BIM memory 512a, 512b is arranged in a 4 Mb deep by 128 bit wide structure. Each SIMM memory module used to compose BIM memories 512a, 512b has 16 full Mb by 1 bit DRAM memories, merge logic and mask logic. Thus, each 4 Mb x 128 BIM memory 512 is equal to one complete page image, dynamically sized per requirements of ECM 600. ECM accesses the image over P bus 1006.

ECM 600

The basic function of ECM 600 is to transfer binary information stored in BIM 512 to the print engine 68 at timings and in quantities/formats demanded by the print engine. Different ECMs 600 are used in this example depending on the particular print engine 68 being employed. To use raster image processor 64 with a different print engine 68, a technician can unplug one ECM 600 modular printed circuit board from a backplane connecting it to the rest of raster image processor 64, and plug in another ECM 600 designed for the new print engine.

Figure 10A:
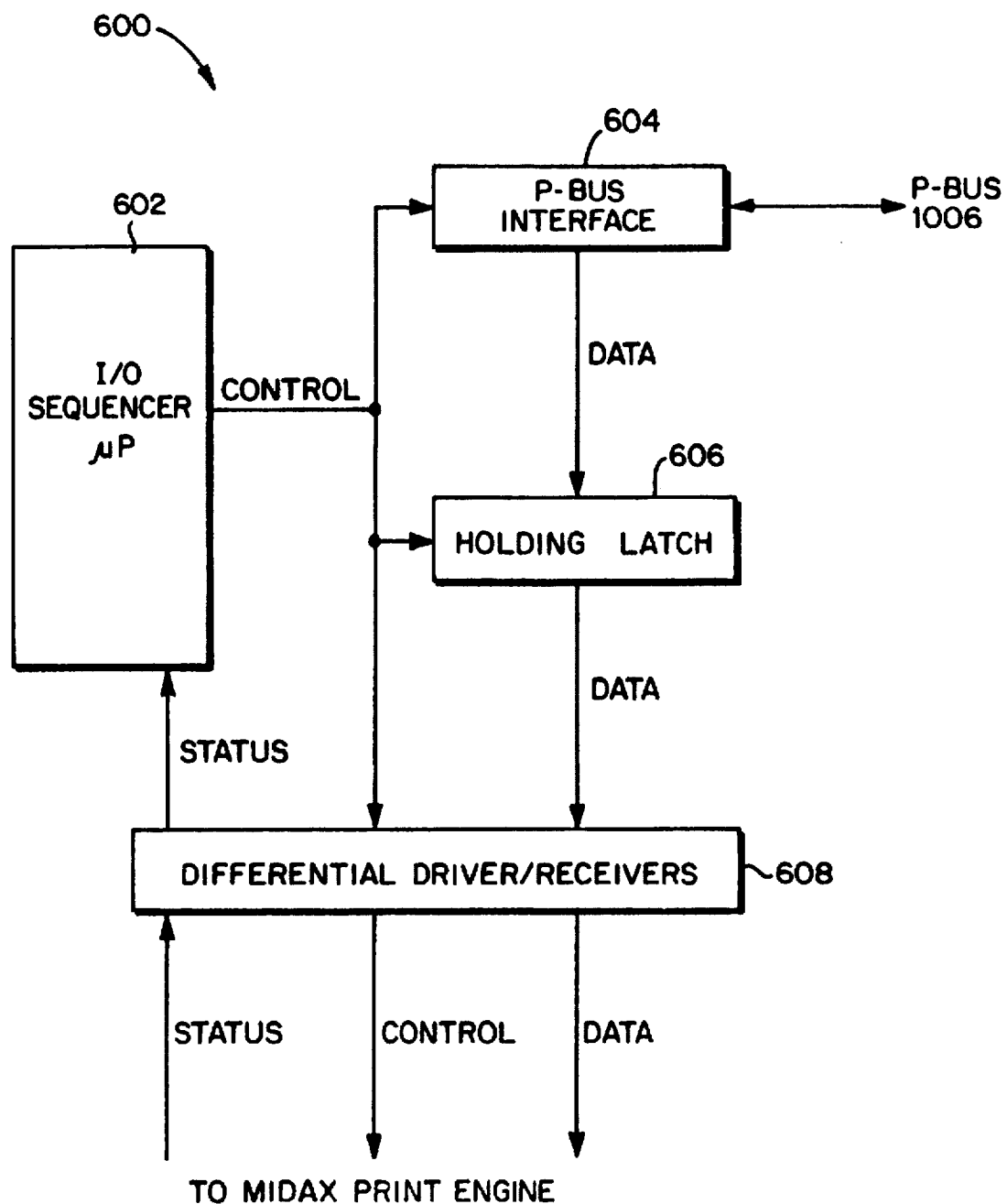
FIGS. 10A and 10B show two different examples of engine control modules 600 for different print engines 68.

FIG. 10A shows an example of an ECM 600 for the MIDAX 300 print engine. In this example, ECM 600 includes a PIC17C42 microcontroller 602, two ASIC chips, and some interface logic including a P-Bus interface 604, a latch 606 and differential drivers/receivers. The microcontroller 602 controls the interface logic to transfer 32 pixels of image from BIG 500 at a time to print engine 68. The internal microcontroller reads 64 pixels of BIG 500 memory over P bus 1006, and latches this double long word into latch 606. It then reads the latch 606 a long word at a time and sends the pixel data to print engine 68 via drivers 608. Associated ASIC-based control logic takes care of synchronization between ECM 600, RISC controller 300, BIG 500 and print engine 68. Additional ASIC-based control logic provides appropriate hand shaking between BIG 500 and print engine 68 under supervision of the ECM internal microcontroller 602. Still additional ASIC-based control logic provides handshaking RISC controller 300 and ECM 600.

Figure 10B:
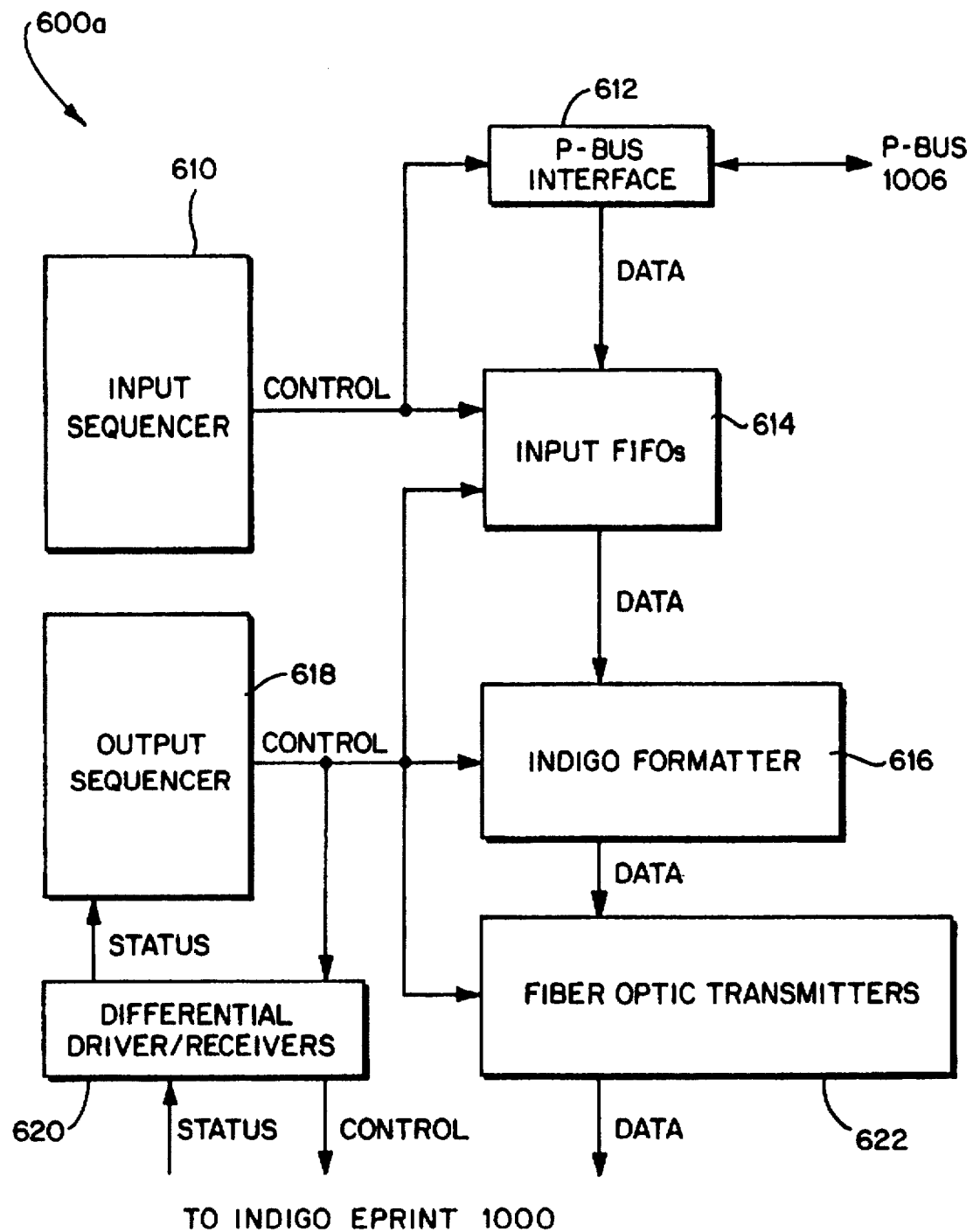

FIG. 10B shows an example of an alternate architecture for an ECM 600a designed to be used with a color high speed printer such as the Indigo print engine. In this alternate example, ECM 600a includes an input sequencer 610, a P-Bus interface 612, input FIFOs 614, an Indigo formatter 616, an output sequencer 618, differential drivers/receivers 620, and fiber optic transmitter 622. In this example, input sequencer 610 (which may be microcontroller based) reads pixels from BIG 500 memory over P-Bus 1006 via P-Bus interface circuitry 612, and stores the read information in input FIFOs 614. Special formatter circuitry 616 under control of output sequencer 618 automatically reformats the input data to conform with the requirements of the Indigo print engine, and provides the output data in reformatted form to the Indigo printer via fiber optic transmitter 622. Differential drivers/receivers 620 communicate status and control signals between output sequencer 618 and the Indigo print engine. ECM 600a includes additional ASIC-based control logic to provide appropriate handshaking with the rest of raster image processor 64 as discussed above.

Graphics Module 900

Figure 11:
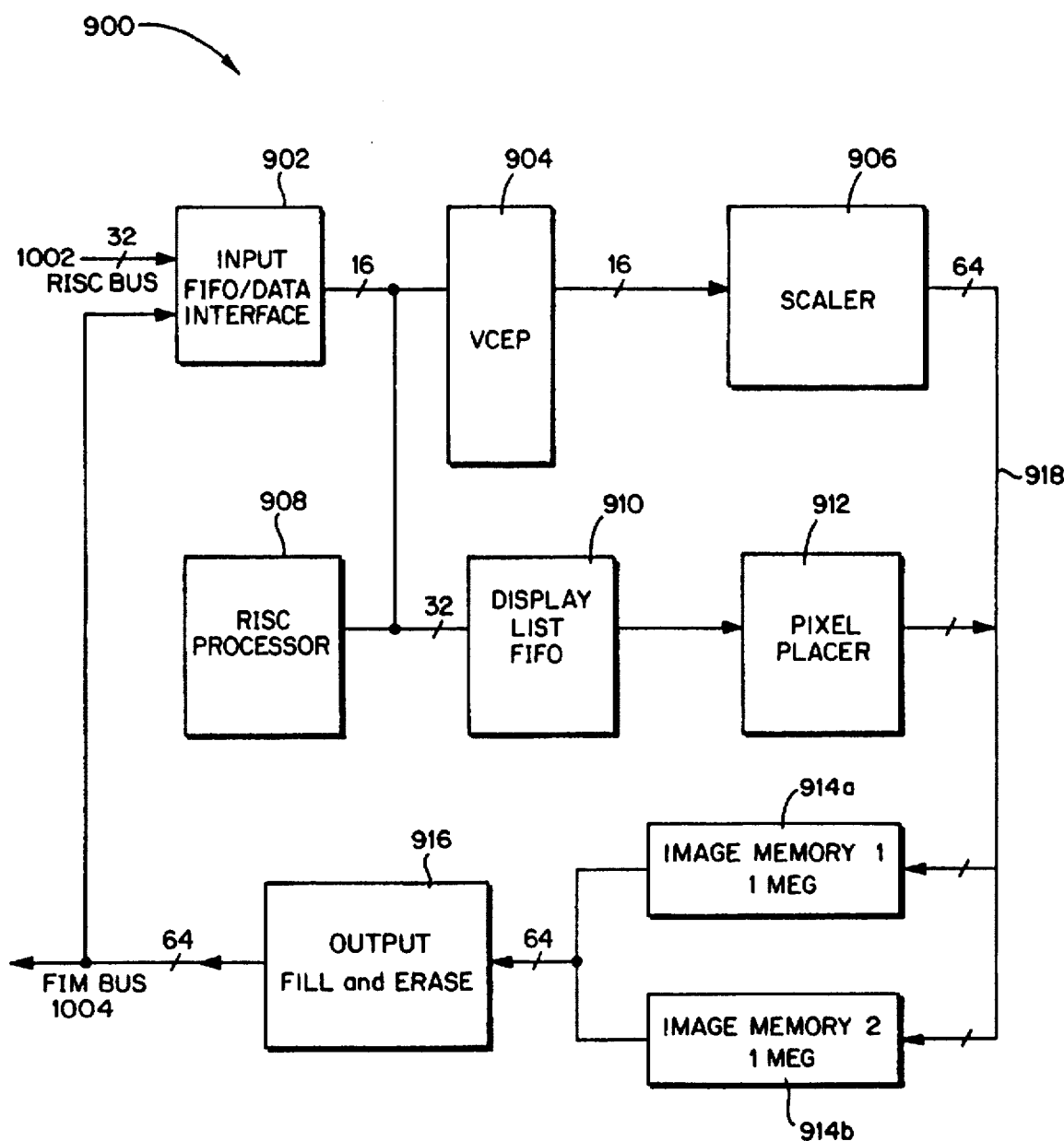
FIG. 11 shows an example architecture for a graphics module 900.

FIG. 11 shows an example architecture for a graphics module 900 shown in FIG. 3A. Graphics module 900 provides raster image processor 64 with both data stream image "lift" capability and vector graphics drawing capability in the preferred embodiment. The data stream image processing may, for example, support CCITT Group 3 and Group 4 image expansion along with variable scaling of non-compressed images. Graphics module 900 may provide full X and Y scaling of the expanded images from ¼ scale to four times before the image is transferred to BIG 500 over F bus 1004.

As shown in FIG. 11, graphics module 900 includes an input FIFO/data interface 902, a VCEP expansion processor 904, a scaler 906, a RISC processor 908, a display list FIFO 910, a pixel placer 912, first and second image memories 914a, 914b, and an output section 916. In this example, graphics processor 900 receives instructions from RISC controller 300 via the R-Bus 1002. In addition, graphics processor 900 may also receive compressed image data over the R-Bus 1002 and/or F bus 1004. The information sent to graphics processor 900 is stored by the graphics processor in input FIFO/data interface 902. This component 902 routes commands to internal RISC processor 908 and/or to display list FIFO 910, and also provides first-in-first-out buffering for compressed (or uncompressed) image data which it routes to VCEP 904 for processing.

VCEP expansion processor 904 comprises a conventional image expander (de-compressor) circuit that operates at 16.6 Mb per second in transparent mode (no compression) and from 20 MB/SEC to 50 MB/SEC on a compressed image— depending on the image compression ratio. VCEP 904 "expands" image data from a more compact, compressed format (used to more efficiently store and communicate the image data) to a decompressed format suitable for imaging. VCEP 904 provides its decompressed output (or transparently passes images data if it was initially provided in decompressed format) to the input of a scaler 906.

Scaler 906 provides conventional full X and Y variable scaling of the expanded image data from, for example, ¼ scale to four times, and provides the scaled, decompressed image data onto an internal data bus 918 for temporary buffering in "double-buffered" image memories 914a, 914b. In this example, the throughput from the output of expansion processor 904 to image memories 914a, 914b may be on the order of 200 ms/word=10 mb/sec (for a scaled image) or on the order of 100 ms/word=20 mb/sec (for a 1:1 scale image).

Graphics RISC processor 908 performs program control steps to coordinate the operations of the other components of graphics module 900. RISC processor 908, display list FIFO 910 and pixel placer 912 in this example support the "on the fly" drawing of full page vector graphics (including optional area filling and accelerated PostScript rendering). More particularly, RISC processor 908 may perform, under software control, certain graphics generation steps based on display list instructions passed to graphics module 900 by RISC controller 300 over R bus 1002. These display list instructions may temporarily reside in display list FIFO 910 while they are being processed. Actual pixel generation is preferably performed by pixel placer 912 under control of a "display list" provided in display list FIFO 910. The display list FIFO 910 does not store display list 82 generated by master controller 200, but rather, stores a different type of display list designed to control pixel placer 912. In this example, pixel placer 912 includes hardware circuitry capable of generating vector graphics at high speed. Pixel placer 912 provides its output to image memories 914a, 914b over internal bus 918. Output bus 916 takes the output from image memories 914a, 914b (the output bus can read from one of image memories 914 while the pixel placer 912 and/or the scaler 906 is filling the other image memory), processes them to provide automatic area filling (e.g., to file in a box automatically), and outputs the graphics results onto F-Bus 1004 for receipt by BIG 500. Additionally, the output block 916 performs "erase" functions to erase already-output data from image memories 914.

Data Cache 800

FIG. 12 shows an example of an architecture for data cache 800. In this example, raster image processor 64 may be enhanced by the use of an array disk drive 802 (e.g., a RAID array manufactured by Maximum Strategy of California providing up to 30 GB of data storage with a 53 MB/SEC output rate). Data cache module 800 maximizes data throughput by "caching" the data output by the RAID drive 802 and placing it onto DC bus 1010 for further processing by screen module 700. In this example, data cache module 800 includes a conventional HIPPI interface 804 providing an interface to the RAID drive 802. The output of interface 804 is provided to a large FIFO RAM (e.g., 128 MB) 806 under control of data cache controller 808 —which in turn receives its instructions (e.g., which graphics to retrieve) from RISC controller 300 via R bus 1002. The information stored in FIFO 806 is provided to DC bus 1010 via high speed output latches 810.

Screen Module 700

FIG. 13 shows an example architecture for screen module 700. In the preferred embodiment, screen module 700 provides the following functions for raster image processor 64:

- it generates screen patterns to be merged by the BIG 500 with character data or to create "screened" lines and boxes;
- it generates a screened image at the proper output resolution from an input contone file of almost any resolution;
- it passes prescreened images from the data cache 800 to the BIG 500; and
- it reads and disposes of data from the data cache 800 to clear the image pipeline of unneeded data.

In this example, screen module 700 includes input FIFOs 702, screening circuits 704, a data shifter 706, an output register 708, an input controller 710, an output controller 712 and a screen RAM address generator 714. In the preferred embodiment screen module 800 receives its input from data cache 800 over the DC bus 1010. This input is temporarily stored in input FIFOs 702. If the data does not need to be screened, it may be passed (e.g., via multiplexors not shown) directly to output register 708 and on to BIG 500 via a screen bus 1012 (see the FIG. 9 diagram of BIG 500, which shows SCR bus 1012 providing an additional input to shifter/multiplier 510).

As is well known, "screening" refers to a process in which contone images are pixelized. If the data needs to be screened, it is passed from input FIFOs 702 to the input of screening circuits 704. A primary function of screen circuits 704 is to generate screened image data at the proper output resolution from an input contone file of almost any resolution. In this example, there are sixteen identical screening circuits as shown in FIG. 14 within screen module 700 to provide 16-channel parallel screen processing. In this example, each screening circuit 704 includes an image data RAM 716, a threshold table RAM 718 and a comparator 720. Image data RAM 76 is used to store image data to be screened received from input FIFOs 702. Threshold table RAM 718 stores an array of "threshold values" and associated screened output values. The contents of RAM 718 may be provided to screen module 700 via RISC controller 300, for example, and can be changed depending on the particular contone image being screened. Threshold table RAM 718 stores threshold or "mapping" information that controls the transformation between an input contone file and screened output data. In this example, a comparator 720 compares each image data value stored in image data -RAM 716 with the threshold values stored in threshold table RAM 718, and provides appropriate corresponding "mapped" or "screened" output data in the form of an output pixel value. This "mapped" "screen" output pixel value is provided to data shifter 706 for temporary storage.

Referring back again to FIG. 13, the output of data shifter 706 is provided to BIG 500 via SCR bus 1012 and output registers 708.

In this example, input controller 710 controls the operation of input FIFOs 702, and output controller 712 controls the operation of output register 708. Input controller 710 and output controller 712 receive instructions from RISC controller 300 over R bus 1002 via a command FIFO 716. Input controller 710, output controller 712 and screen RAM address generator 714 also provide their control inputs to screening circuits 704 to allow the screening circuits to synchronize their operations. Screen RAM address generator 714 is used to address image data RAM 716 and also to control data shifter 706.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A raster image processor operable with any particular one of plural different incompatible print engines, said raster image processor comprising:

a processor portion of said raster image processor that receives a display list and performs image generation functions based thereon;

a processor bus connected to said processor portion;

a font image memory connected to said processor bus, said font image memory storing fonts for imaging; and a bit image generator connected to said processor bus, said bit image generator forming a digital representation of an image based on said stored fonts and said display list and outputting said formed digital representation; and a replaceable plug-in engine control module for providing said formed digital representation to said particular print engine at a timing and in a format required by at least one of said particular print engines.

2. A raster image processor comprising:

a processor portion of said raster image processor that receives a display list and performs image generation functions based thereon;

a processor bus connected to said processor portion;

a font image memory connected to said processor bus, said font image memory storing fonts for imaging;

a data cache coupled to said processor bus, said data cache storing and supplying predefined graphics; and a bit image generator connected to said processor bus, said bit image generator forming a digital representation of an image based on said stored fonts, said supplied predefined graphics and said display list and outputting said formed digital representation.

3. A raster image processor comprising:

a processor portion of s aid raster image processor that receives a display list and performs image generation functions based thereon;

a processor bus connected to said processor portion;

a font image memory connected to said processor bus, said font image memory storing fonts for imaging;

a bit image generator connected to said processor bus, said bit image generator forming a digital representation of an image based on said stored fonts and said image generation functions and outputting said formed digital representation; and means coupled to said bit image generator for providing output data to either of two difficult incompatible print engines, said providing means including:

a first engine control module for reading data from said bit image generator and outputting said read data to a first print engine, a second engine control module for reading data from said bit image generator and outputting said read data to a second print engine different from said first print engine, and a connector adapted to alternately receive said first engine control module and said second engine control module, and to couple the engine control module control module received by the connector to said bit image generator, wherein said raster image processor can output said formed digital representation at a rate in excess of 300 million pixels per second.

4. A raster image processor comprising:

a processor portion of said raster image processor that receives a display list and performs image generation functions based thereon;

a processor bus connected to said processor portion;

a font image memory connected to said processor bus, said font image memory storing fonts for imaging;

a bit image generator connected to said processor bus, said bit image generator forming a digital representation of an image based on said stored fonts and said image generation functions and outputting said formed digital representation;

a data cache coupled to said processor bus, said data cache retrieving from a library of graphics and providing retrieved graphics data to said bit image generator; and wherein said raster image processor can output said formed digital representation at a rate in excess of 300 million pixels per second.

5. A raster image processor comprising:

a processor portion of said raster image processor that receives a display list and performs image generation functions based thereon;

a processor bus connected to said processor portion;

a font image memory connected to said processor bus, said font image memory storing fonts for imaging;

a bit image generator connected to said processor bus, said bit image generator forming a digital representation of an image based on said stored fonts and said image generation functions and outputting said formed digital representation;

screening means coupled to said bit image generator for converting continuous tone input data to screened output data and for providing said screened output data to said bit image generator; and wherein said raster image processor can output said formed digital representation at a rate in excess of 300 million pixels per second.

6. A raster image processor comprising:

a processor portion of said raster image processor that receives a display list and performs image generation functions based thereon;

a processor bus connected to said processor portion;

a font image memory connected to said processor bus, said font image memory storing fonts for imaging;

a bit image generator connected to said processor bus, said bit image generator forming a digital representation of an image based on said stored fonts and said image generation functions and outputting said formed digital representation;

means coupled to said bit image generator for providing output data to either of two different incompatible print engines; and wherein said raster image processor can output said formed digital representation at a rate in excess of 300 million pixels per second.

\* \* \* \* \*